United States Patent
Knudsen et al.

(10) Patent No.: US 12,279,213 B2
(45) Date of Patent: Apr. 15, 2025

(54) UE INDICATION OF ESTIMATED MPR ON UL BEAM PAIR FOR STXMP

(71) Applicant: Nokia Technologies Oy, Espoo (FI)

(72) Inventors: Knud Knudsen, Aalborg (DK); Samantha Caporal Del Barrio, Aalborg (FI); Jan Torst Hviid, Aalborg (DK); Morten Toft, Aalborg (DK)

(73) Assignee: Nok Technologies Oy, Espoo (FI)

( * ) Notice: Subject to any disclaimer, the term of this patent is extended or adjusted under 35 U.S.C. 154(b) by 0 days.

(21) Appl. No.: 18/926,402

(22) Filed: Oct. 25, 2024

(65) Prior Publication Data
US 2025/0048278 A1 Feb. 6, 2025

Related U.S. Application Data

(63) Continuation of application No. PCT/IB2024/055636, filed on Jun. 9, 2024.

(60) Provisional application No. 63/472,025, filed on Jun. 9, 2023.

(51) Int. Cl.
*H04W 52/36* (2009.01)
*H04B 7/06* (2006.01)
*H04B 7/0413* (2017.01)

(52) U.S. Cl.
CPC ........ *H04W 52/365* (2013.01); *H04B 7/0695* (2013.01); *H04B 7/0413* (2013.01)

(58) Field of Classification Search
CPC .. H04W 52/365; H04W 52/36; H04B 7/0695; H04B 7/0413
See application file for complete search history.

(56) References Cited

U.S. PATENT DOCUMENTS

| 2015/0271811 | A1* | 9/2015 | Kim ............. H04W 52/34 370/329 |
| 2020/0162144 | A1* | 5/2020 | Zhou ............. H04B 7/088 |
| 2024/0049242 | A1* | 2/2024 | Bai ............. H04L 5/0035 |

FOREIGN PATENT DOCUMENTS

WO   WO 2023/073929 A1   5/2023

OTHER PUBLICATIONS

Huawei et al., "Corrections to FeMIMO MAC," 3GPP TSG-RAN WG2 Meeting #119-e, R2-2208653, Aug. 17-29, 2022.
Ericsson, "MPE for EN-DC, NE-DC, NR-DC and DAPS," 3GPP TSG-RAN WG2 #112e, Tdoc R2-2010516, Nov. 2-13, 2020.

* cited by examiner

*Primary Examiner* — John J Lee
(74) *Attorney, Agent, or Firm* — McCarter & English, LLP

(57) ABSTRACT

An apparatus may be configured to: receive, from a first network node, a first indication to activate a first set of transmission configuration indicator states associated with the first network node; receive, from the first network node, a second indication of a second network node, wherein the apparatus is configured to perform simultaneous transmission, with the first network node and the second network node; and transmit, to the first network node, a first report, wherein the first report comprises at least one indication of a presence of a power backoff value associated with a pair of transmission configuration indicator states.

20 Claims, 12 Drawing Sheets

| | | | | | | | | |
|---|---|---|---|---|---|---|---|---|
| P | R | \multicolumn{7}{c|}{PH (Type 1, PCell)} | Oct 1 |

| | | |
|---|---|---|
| P | R | PH (Type 1, PCell) |
| MPE or R | | $P_{CMAX,f,c}$ |
| $B_1$ \| $B_2$ \| $B_3$ \| $B_4$ \| $P_1$ \| $P_2$ \| $P_3$ \| $P_4$ | | |
| $MPE_1$ or R \| $MPE_2$ or R \| $MPE_3$ or R \| $MPE_4$ or R | | |
| R \| R | | $Resource_1$ |
| R \| R | | $Resource_2$ |
| R \| R | | $Resource_3$ |
| R \| R | | $Resource_4$ |

Oct 1
Oct 2
Oct 3
Oct 4
Oct 5
Oct 6 (Optional)
Oct 7 (Optional)
Oct 8 (Optional)

FIG. 7

| P | V | PH 1 (Type 1, PCell) | Oct 1
|---|---|---|---
| R | V | PH 2 (Type 1, PCell) | Oct 2
| MPE or R | | $P_{CMAX,f,c}$ | Oct 3

FIG. 8

| $C_7$ | $C_6$ | $C_5$ | $C_4$ | $C_3$ | $C_2$ | $C_1$ | R |
|---|---|---|---|---|---|---|---|
| P | V | \multicolumn{6}{l|}{PH 1 (Type 2, SpCell of the other MAC entity)} |
| R | V | \multicolumn{6}{l|}{PH 2 (Type 2, SpCell of the other MAC entity)} |
| MPE or R | | | | | | | |
| P | V | | | | | | |

| | | |
|---|---|---|
| $C_7$ $C_6$ $C_5$ $C_4$ $C_3$ $C_2$ $C_1$ R | | |
| P V | PH 1 (Type 2, SpCell of the other MAC entity) | |
| R V | PH 2 (Type 2, SpCell of the other MAC entity) | (Optional) |
| MPE or R | $P_{CMAX,f,c}$ 1 | |
| P V | PH 1 (Type 1, PCell) | |
| R V | PH 2 (Type 1, PCell) | (Optional) |
| MPE or R | $P_{CMAX,f,c}$ 2 | |
| P V | PH 1 (Type X, Serving Cell 1) | |
| R V | PH 2 (Type X, Serving Cell 1) | (Optional) |
| MPE or R | $P_{CMAX,f,c}$ 3 | |

...

| | | |
|---|---|---|
| P V | PH 1 (Type X, Serving Cell n) | |
| R V | PH 2 (Type X, Serving Cell n) | (Optional) |
| MPE or R | $P_{CMAX,f,c}$ m | |

FIG. 9

| MPE$_1$ or R | MPE$_2$ or R | MPE$_3$ or R | MPE$_4$ or R |
|---|---|---|---|
| R | R | \multicolumn{2}{c|}{Resource$_1$} |
| R | R | \multicolumn{2}{c|}{Resource$_2$} |
| R | R | \multicolumn{2}{c|}{Resource$_3$} |
| R | R | \multicolumn{2}{c|}{Resource$_4$} |

FIG. 10

UE INDICATION OF ESTIMATED MPR ON UL BEAM PAIR FOR STXMP

This application claims priority from PCT Application No. PCT/IB2024/055636, filed on Jun. 9, 2024, which claims priority from U.S. provisional Application No. 63/472,025, filed on Jun. 9, 2023.

TECHNICAL FIELD

The example and non-limiting embodiments relate generally to uplink MIMO/beamforming and, more particularly, to simultaneous transmission across multiple panels (STxMP).

BACKGROUND

It is known, in cellular communication, for a user equipment to provide a power headroom report (PHR).

SUMMARY

The following summary is merely intended to be illustrative. The summary is not intended to limit the scope of the claims.

In accordance with one aspect, an apparatus comprising: at least one processor; and at least one memory storing instructions that, when executed by the at least one processor, cause the apparatus at least to: receive, from a first network node, a first indication to activate a first set of transmission configuration indicator states associated with the first network node; receive, from the first network node, a second indication of a second network node, wherein the apparatus is configured to perform simultaneous transmission, with the first network node and the second network node; and transmit, to the first network node, a first report, wherein the first report comprises at least one indication of a presence of a power backoff value associated with a pair of transmission configuration indicator states.

In accordance with one aspect, a method comprising: receiving, with a user equipment, from a first network node, a first indication to activate a first set of transmission configuration indicator states associated with the first network node; receiving, from the first network node, a second indication of a second network node, wherein the user equipment is configured to perform simultaneous transmission, with the first network node and the second network node; and transmitting, to the first network node, a first report, wherein the first report comprises at least one indication of a presence of a power backoff value associated with a pair of transmission configuration indicator states.

In accordance with one aspect, an apparatus comprising means for: receiving, from a first network node, a first indication to activate a first set of transmission configuration indicator states associated with the first network node; receiving, from the first network node, a second indication of a second network node, wherein the apparatus is configured to perform simultaneous transmission, with the first network node and the second network node; and transmitting, to the first network node, a first report, wherein the first report comprises at least one indication of a presence of a power backoff value associated with a pair of transmission configuration indicator states.

In accordance with one aspect, a non-transitory computer-readable medium comprising program instructions stored thereon for performing at least the following: causing receiving, with a user equipment from a first network node, of a first indication to activate a first set of transmission configuration indicator states associated with the first network node; causing receiving, from the first network node, of a second indication of a second network node, wherein the user equipment is configured to perform simultaneous transmission, with the first network node and the second network node; and causing transmitting, to the first network node, of a first report, wherein the first report comprises at least one indication of a presence of a power backoff value associated with a pair of transmission configuration indicator states.

In accordance with one aspect, an apparatus comprising: at least one processor; and at least one memory storing instructions that, when executed by the at least one processor, cause the apparatus at least to: transmit, to a user equipment, a first indication to activate a first set of transmission configuration indicator states associated with the apparatus; transmit, to the user equipment, a second indication of a network node, wherein the user equipment is configured to perform simultaneous transmission with the apparatus and the network node; and receive, from the user equipment, a first report, wherein the first report comprises at least one indication of a presence of a power backoff value associated with a pair of transmission configuration indicator states.

In accordance with one aspect, a method comprising: transmitting, with a first network node to a user equipment, a first indication to activate a first set of transmission configuration indicator states associated with the first network node; transmit, to the user equipment, a second indication of a network node, wherein the user equipment is configured to perform simultaneous transmission with the first network node and the network node; and receive, from the user equipment, a first report, wherein the first report comprises at least one indication of a presence of a power backoff value associated with a pair of transmission configuration indicator states.

In accordance with one aspect, an apparatus comprising means for: transmitting, to a user equipment, a first indication to activate a first set of transmission configuration indicator states associated with the apparatus; transmitting, to the user equipment, a second indication of a network node, wherein the user equipment is configured to perform simultaneous transmission with the apparatus and the network node; and receiving, from the user equipment, a first report, wherein the first report comprises at least one indication of a presence of a power backoff value associated with a pair of transmission configuration indicator states.

In accordance with one aspect, a non-transitory computer-readable medium comprising program instructions stored thereon for performing at least the following: causing transmitting, with a first network node to a user equipment, of a first indication to activate a first set of transmission configuration indicator states associated with the first network node; causing transmitting, to the user equipment, of a second indication of a network node, wherein the user equipment is configured to perform simultaneous transmission with the first network node and the network node; and causing receiving, from the user equipment, of a first report, wherein the first report comprises at least one indication of a presence of a power backoff value associated with a pair of transmission configuration indicator states.

In accordance with one aspect, an apparatus comprising: at least one processor; and at least one memory storing instructions that, when executed by the at least one processor, cause the apparatus at least to: transmit, to a user equipment, an indication to activate a second set of transmission configuration indicator states associated with the apparatus; and receive, from the user equipment, a second report, wherein the second report comprises at least one indication of presence of a power backoff value associated with a pair of transmission configuration indicator states.

In accordance with one aspect, a method comprising: transmitting, with a first network node to a user equipment, an indication to activate a second set of transmission configuration indicator states associated with the apparatus; and receiving, from the user equipment, a second report, wherein the second report comprises at least one indication of presence of a power backoff value associated with a pair of transmission configuration indicator states.

In accordance with one aspect, an apparatus comprising means for: transmitting, to a user equipment, an indication to activate a second set of transmission configuration indicator states associated with the apparatus; and receiving, from the user equipment, a second report, wherein the second report comprises at least one indication of presence of a power backoff value associated with a pair of transmission configuration indicator states.

In accordance with one aspect, a non-transitory computer-readable medium comprising program instructions stored thereon for performing at least the following: causing transmitting, with a first network node to a user equipment, of an indication to activate a second set of transmission configuration indicator states associated with the first network node; and causing receiving, from the user equipment, off a second report, wherein the second report comprises at least one indication of presence of a power backoff value associated with a pair of transmission configuration indicator states.

According to some aspects, there is provided the subject matter of the independent claims. Some further aspects are defined in the dependent claims.

BRIEF DESCRIPTION OF THE DRAWINGS

The foregoing aspects and other features are explained in the following description, taken in connection with the accompanying drawings, wherein:

FIG. 7 is a diagram illustrating features as described herein;

FIG. 8 is a diagram illustrating features as described herein;

FIG. 9 is a diagram illustrating features as described herein;

FIG. 10 is a diagram illustrating features as described herein;

DETAILED DESCRIPTION OF EMBODIMENTS

Figure 1:
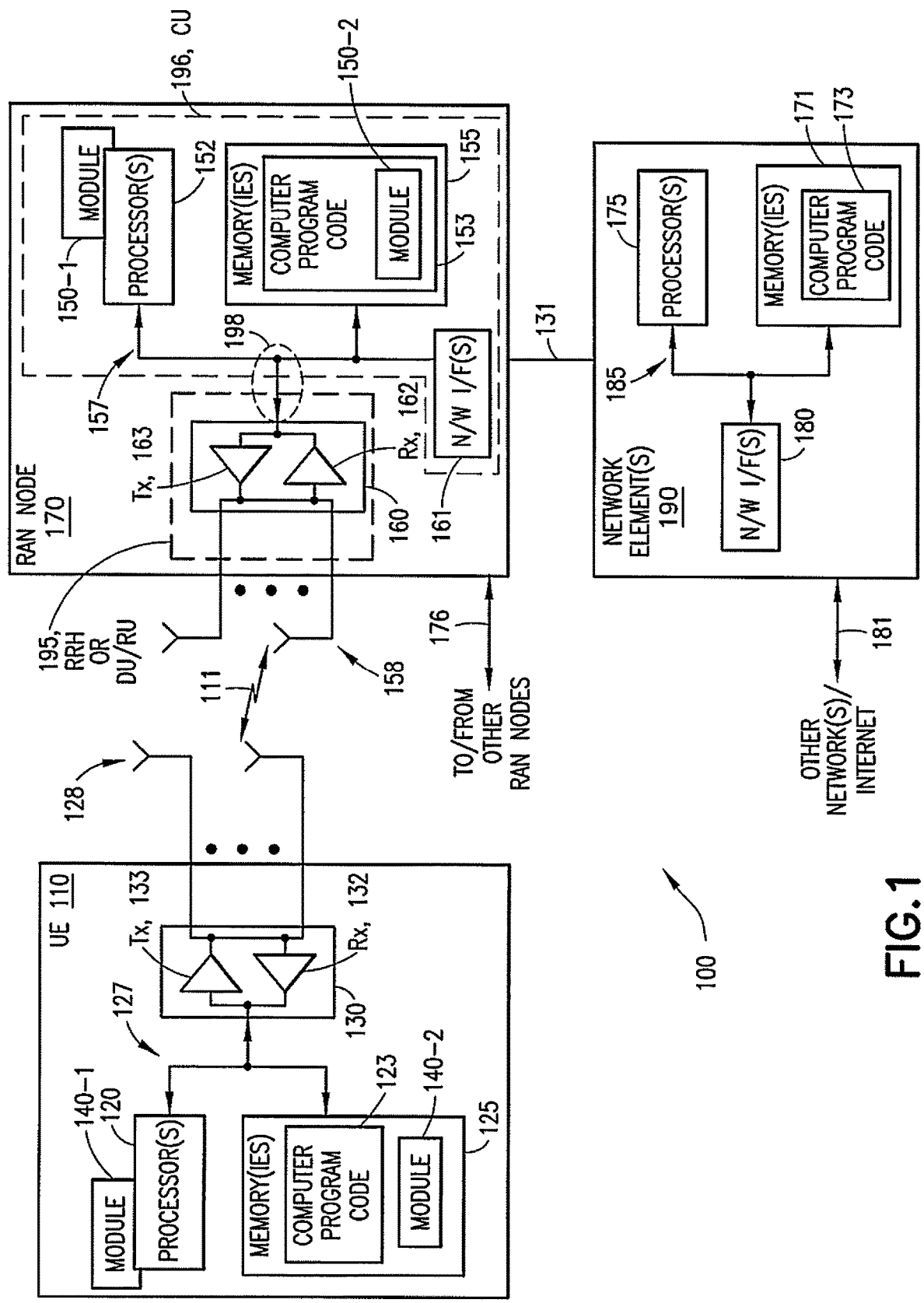
FIG. 1 is a block diagram of one possible and non-limiting example system in which the example embodiments may be practiced.

The following abbreviations that may be found in the specification and/or the drawing figures are defined as follows:
3GPP third generation partnership project
5G fifth generation
5GC 5G core network
AMF access and mobility management function
CE control element
CPE customer premise equipment
CRI CSI-RS resource indicator
CSI channel state information
cRAN cloud radio access network
CRI corresponding resource indicator
CU central unit
DCI downlink control information
DL downlink
DU distributed unit
EIRP equivalent isotropic radiation power
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FWA fixed wireless access
gNB (or gNodeB) base station for 5G/NR, i.e., a node providing NR user plane and control plane protocol terminations towards the UE, and connected via the NG interface to the 5GC
I/F interface
L1 layer 1
LTE long term evolution
MAC medium access control
mDCI multiple downlink control information
MIMO multiple input multiple output
MME mobility management entity
MPE maximum permissible exposure
MPR maximum power reduction
mTRP multiple transmission and reception points
ng or NG new generation
ng-eNB or NG-eNB new generation eNB
NR new radio
N/W or NW network
O-RAN open radio access network
PA power amplifier
PDCP packet data convergence protocol
PH power headroom
PHR power headroom report
PHY physical layer
P-MPR power management maximum power reduction
PRB physical resource block
PUSCH physical uplink shared channel
RAN radio access network
RB resource block
RF radio frequency
RLC radio link control
RRC radio resource control
RRH remote radio head
RS reference signal
RSRP reference signal received power RU radio unit
Rx receiver
SCH shared channel
SDAP service data adaptation protocol
sDCI single downlink control information
SGW serving gateway
SINR signal to interference plus noise ratio
SMF session management function
SSB synchronization signal block
SSBRI synchronization signal block resource block indicator
STxMP simultaneous transmission across multiple panels
TCI transmission configuration indicator
TRP total radiated power
TRP transmit receive point
Tx transmitter
UE user equipment (e.g., a wireless, typically mobile device)
UL uplink
UPF user plane function
VNR virtualized network function Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. A "circuit" may include dedicated hardware or hardware in association with software executable thereon. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190).

The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station, access point, access node, or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. For example, a network may be deployed in a tele cloud, with virtualized network functions (VNF) running on, for example, data center servers. For example, network core functions and/or radio access network(s) (e.g. CloudRAN, O-RAN, edge cloud) may be virtualized. Note that the virtualized entities that result from the network virtualization are still implemented, at some level, using hardware such as processors 152 or 175 and memories 155 and 171, and also such virtualized entities create technical effects.

It may also be noted that operations of example embodiments of the present disclosure may be carried out by a plurality of cooperating devices (e.g. cRAN).

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the example embodiments of the present disclosure, example embodiments will now be described with greater specificity.

Features as described herein may generally relate to simultaneous transmission across multiple panels (STxMP). In RAN #98e, the multiple input multiple output (MIMO) evolution work item RP-223276 on downlink and uplink was approved. Among its objectives is the study and specification of STxMP for multiple transmission and reception point (multi-TRP) operations.

Figure 2:
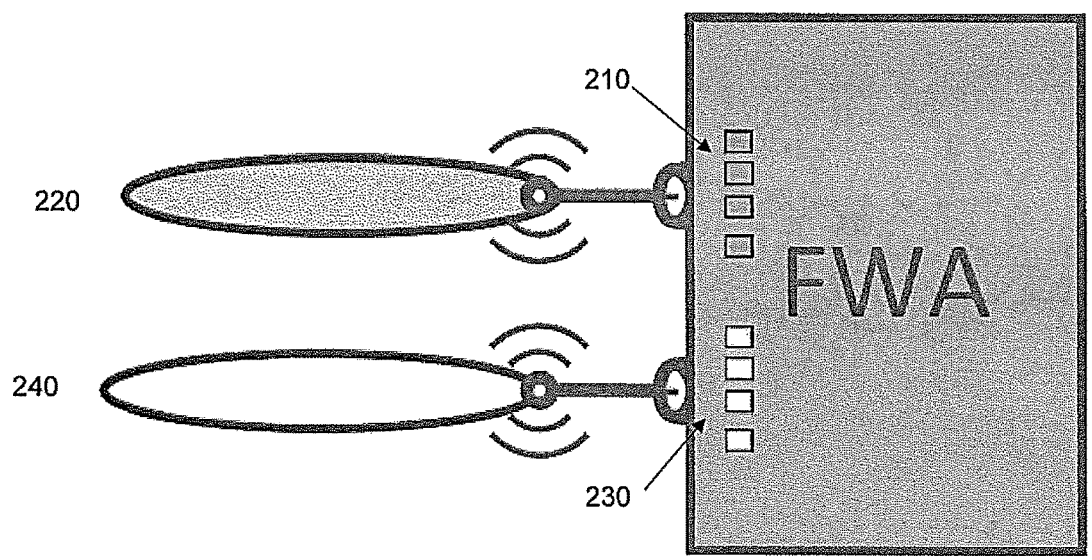
FIG. 2 is a diagram illustrating features as described herein.

In the RAN4 radio frequency (RF) group, the discussion focuses on the uplink (UL) power requirements for multiple UE panels simultaneously transmitting. The UE's maximum peak equivalent isotropic radiation power (EIRP) is achieved when two panels are transmitting with maximum power amplifier (PA) power, and with two directional TX beams steered in the same direction and added up constructively, as depicted in FIG. 2. In the example of FIG. 2, beams 220, 230 from two panels 210, 220 of a UE are steered in the same general direction. The maximum radiated power may be achieved when both panels are pointing in the same direction. The panels may also be understood, and referred to as, antenna panels.

Since maximum peak EIRP is a regulatory requirement, the UE must autonomously apply power back-off to ensure that it is not violating the radiated power requirements.

The RAN1 WID (Work Item Description) is targeting fixed wireless access premise (FWA), customer equipment (CPE), vehicular devices, and/or industrial devices; these may be considered power class 1 and 2 devices, although this is not required (i.e. other poser classes may be possible). The maximum output power limits for power class 1 and 2 are specified in 3GPP TS38.101-2, and the tables covering the UL MIMO cases are copied below for reference.

Referring now to TABLE 1, illustrated is Table 6.2D.1.1-3: UE maximum output power limits for UL MIMO for power class 1:

TABLE 1

| Operating band | Max TRP (dBm) | Max EIRP (dBm) |
|---|---|---|
| n257 | 35 | 55 |
| n258 | 35 | 55 |
| n260 | 35 | 55 |
| n261 | 35 | 55 |
| n262 | 35 | 55 |

Referring now to TABLE 2, illustrated is Table 6.2D.1.2-2: UE maximum output power limits for UL MIMO for power class 2:

TABLE 2

| Operating band | Max TRP (dBm) | Max EIRP (dBm) |
|---|---|---|
| n257 | 23 | 43 |
| n258 | 23 | 43 |
| n261 | 23 | 43 |
| n262 | 23 | 43 |

TABLE 1 and TABLE 2 show that the maximum power limit per UE panel during UL MIMO with multiple active panels are the same as when operating with a single active panel. That is to say that each UE panel (operating individually) must be below the total radiated power (TRP) value of 35 dBm, while the UE with simultaneously transmitting panels must also be below the TRP value of 35 dBm. For example, each panel may be transmitting with 29 dBm for 4-layer UL MIMO (i.e. 35 dBm available power divided by 2 panels, divided by 2 polarizations). As such, it is clear that the output power limits are defined per UE, and not per UE panel.

In FIG. 2, the two antenna panels 210, 230 are mounted on the same side of the FWA device, which leads to a risk of exceeding the UE power limit if both panels are transmitting at maximum. Furthermore, even in other implementations, the combined radiated power may exceed the max EIRP. This may, for instance, be in the overlap area of the use cases, as depicted in FIG. 3.

Figure 3:
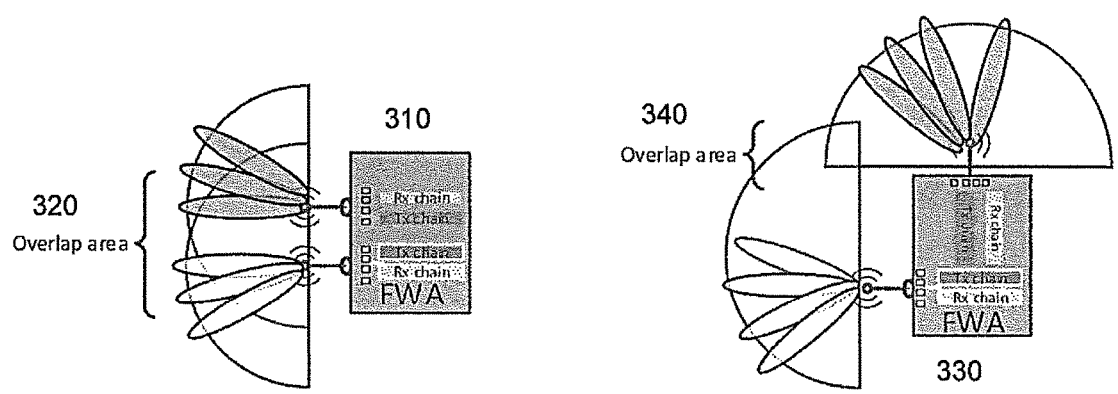
FIG. 3 is a diagram illustrating features as described herein.

Referring now to FIG. 3, illustrated are examples of UE architecture yielding an area where there is an overlap, and the summed radiated power may exceed the specified limit if UE does not use power back-off. The FWA 310 includes two panels on the same side, which may result in overlapping area 320. The FWA 330 includes panels on different sides, which may still result in overlapping area 340. The power management maximum power reduction (P-MPR) framework allows the UE to reduce the maximum transmitted power as defined in TS38.101-2 on each of the transmitters, and thereby comply with the regulatory requirements for the maximum EIRP. P-MPR$_{f,c}$ is the power management maximum output power reduction. The UE shall apply P-MPR$_{f,c}$ for carrier f of serving cell c only.

The determined overlap may comprise overlap between activated UE panels. Additionally or alternatively, the determined overlap may comprise overlap between angles of arrival. Additionally or alternatively, the determined overlap may comprise overlap between angles of departure. Additionally or alternatively, the determined overlap may comprise UE Tx beam radiation pattern (beamwidth). Additionally or alternatively, the determined overlap may comprise UE Tx beam steering angle. Additionally or alternatively, the determined overlap may comprise UE Tx antenna gain.

Features as described herein may generally relate to the power headroom report (PHR). PHR is a type of MAC control element (CE) message as defined in 3GPP TS 38.321, and is used to report the power headroom (PH). The PH is defined as the difference between the nominal maximum output power and the estimated output power for UL-SCH transmission: PH=UE Max Transmission Power-PUSCH Power=Pmax−P_pusch.

Figure 4:
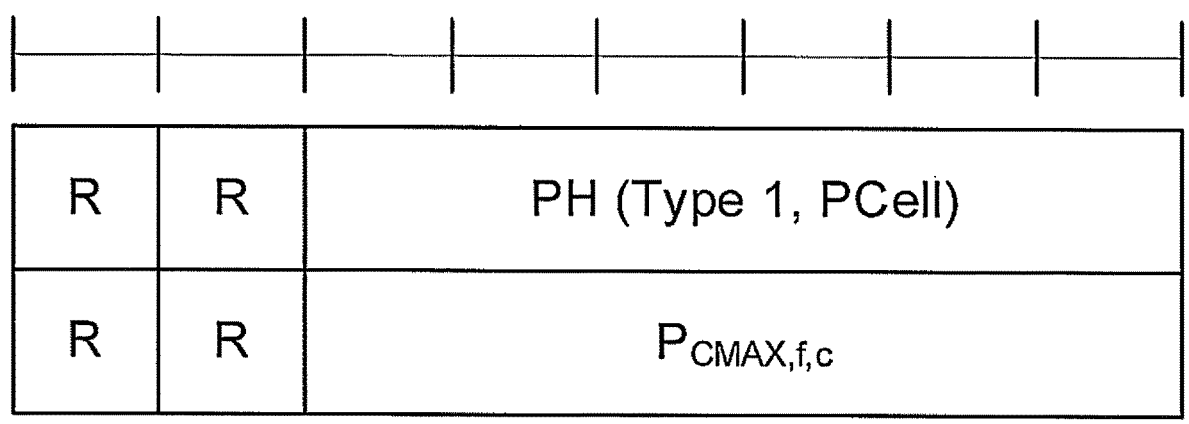
FIG. 4 is a diagram illustrating features as described herein.

Referring now to FIG. 4, illustrated is an example of PHR as specified in TS38.321. The network uses the PH to evaluate how many uplink resources it can schedule to the UE without exceeding its maximum power. $P_{CMAX}$ is defined in TS 38.101-2 as the maximum configured transmitted power by the UE.

The 3GPP RAN4 Way Forward after February meeting (R4-2303495) resulted in the following:

" . . . Proposed UE RF agenda from next meeting, RAN4 #106-bis-e
3. General and work plan
4. UE RF on simultaneous transmission with multi-panel (STxMP)
   2.1 Per-panel power limitation
   2.2 Per-UE power limitation
<Agreement>: FR2 power class applicability
Consider PC1/PC2/PC4/PC5/[PC6] only.
<Agreement>
Current defined power classes shall be considered further as reference for any power limitation discussions while defining the new requirements for STxMP case, if needed.
<Way forward>: 'Per-TCI state' configured power for 'per-panel' power limitation
   Companies are encouraged to provide view on 'Per-TCI state' power limitation, or other solutions to support 'per-panel' power control based on realistic implementation considerations.
<Way forward>: Method to specify 'per-UE' power limitation
   Companies are encouraged to provide view on 'Per-UE' power limitation for STxMP with following options
   Option 1: Reuse legacy requirement for STxMP
   Option 2: Define new requirements as 'total power concept' for STxMP . . . "

Features as described herein may relate to simultaneous transmission of multiple beams. When transmitting on multiple beams simultaneously and the beams overlap (see use case example illustrated in FIG. 5), there is a risk that the transmitted beams from each panel are overlapping, and thereby the UE peak EIRP for some directions exceeds the maximum allowed EIRP. Consequently, the UE must reduce its output power to be compliant with regulatory requirements, namely max total radiated power (TRP) and max peak EIRP.

Since the network is not aware of the UE radiation patterns and panel placements, it cannot evaluate if UL beam pairs are overlapping and if there is a need to perform P-MPR, by the UE, for the given beam combination.

P-MPR is applied by the UE autonomously, and the gNB is not aware of the actual P-MPR value the UE is using, or when it is used. P-MPR scales down the $P_{CMAX}$ value in PHR reporting (which reduces PH), but the network is not aware of whether $P_{CMAX}$ is reduced due to P-MPR, or due to other factors, or due to a combination thereof.

Figure 5:
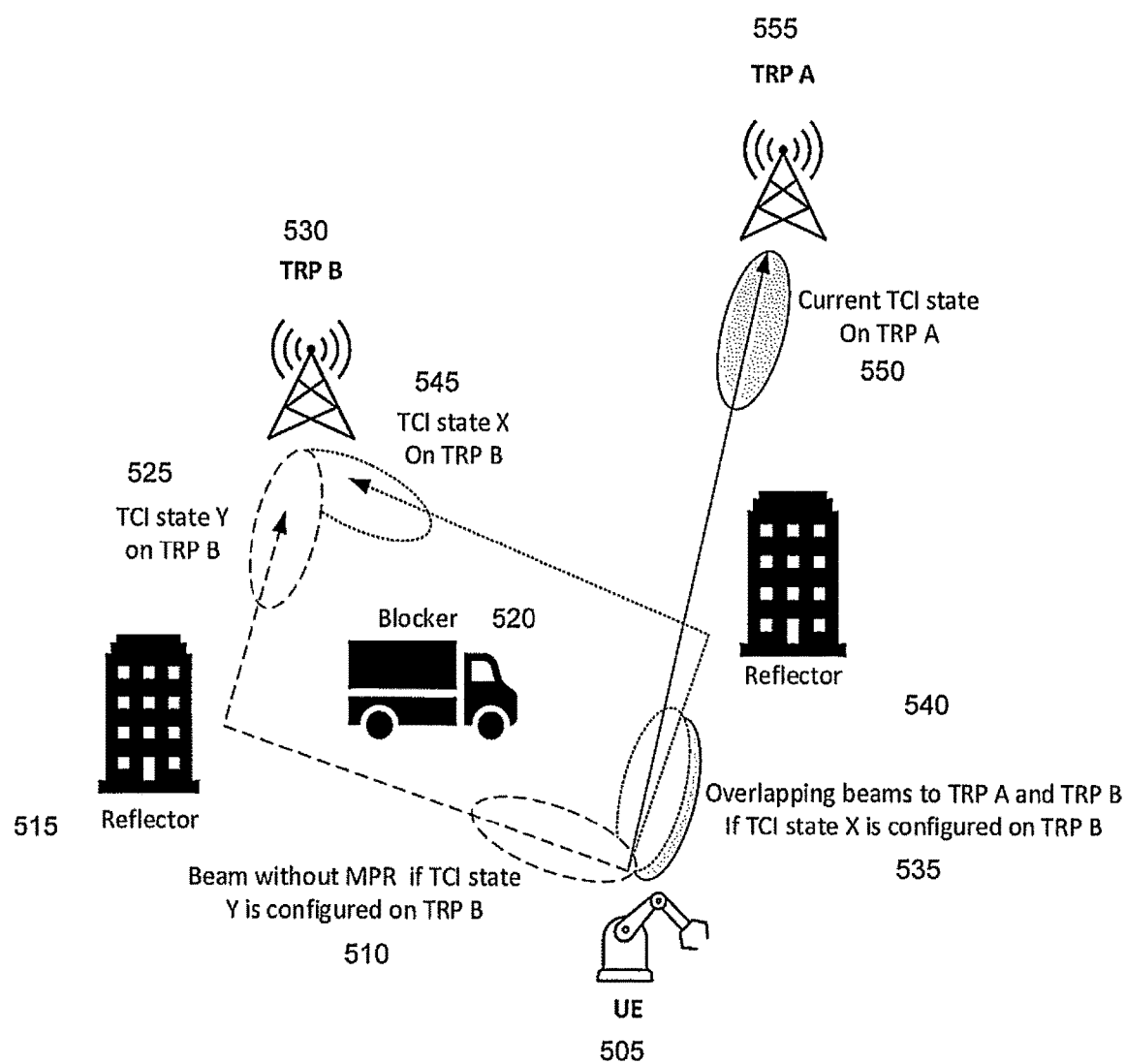
FIG. 5 is a diagram illustrating features as described herein.

Beams are identified by transmission configuration indicator (TCI) states. The gNB might add or change the active TCI state(s)/beams of the UE depending on radio conditions, mobility, etc. Referring now to FIG. 5, illustrated are examples of use cases where the network may consider the P-MPR and prioritize an alternative TCI state, since it does not cause P-MPR. It is assumed that the maximum EIRP is exceeded. The UE (505) may direct a beam in a direction in which a reflector (515) is present, for example so as to avoid a blocker (520), and reach TRP B (530). At 510, the beam may be a beam without MPR if TCI state Y is configured on TRP B. At 525, the TCI state Y may be active on TRP B.

The UE (505) may direct a beam in a direction in which a reflector (540) is present, for example so as to avoid a blocker (520), and reach TRP B (530). At 545, the TCI state X may be active on TRP B.

The UE (505) may direct a beam in a direction of TRP A (555). At 550, the current TCI state may be on TRP A. At 535, there may be overlapping beams to TRP A and TRP B if TCI state X is configured on TRP B. TRP A and TRP B may belong to the same cell, or to different cells. If TRP A and TRP B belong to different cells, then these different cell may be located in the same gNB, or in different gNBs.

In an example, assume that the L1-RSRP measurement reports have indicated the below RSRP values:
  a) L1-RSRP=−80 dBm for TCI state X;
  b) L1-RSRP=−81 dBm for TCI state Y.

In addition, assume that the UE is switched from operating on 1 UL TCI state to operating on 2 UL TCI states simultaneously (i.e. STxMP operation, (e.g. from requesting scheduling of additional uplink data)), and the UE is transmitting with maximum power (e.g. maximum bandwidth allocation). As a result, the uplink resource allocation for the UE is power limited (due to max PRB allocation and link budget) and the following P-MPR values would apply (due to maximum power transmission) for each of the above candidate links:
  c) P-MPR for TCI state X=3 dB and P-MPR for current TCI state=3 dB;
  d) P-MPR for TCI state Y=0 dB and P-MPR for current TCI state=3 dB.

In this case, even if the L1-RSRP level suggests that the link budget is better for TCI state X (report in a)), the gNB would select TCI state X to add to current TCI state for STxMP operation. However, this beam selection would result in a sub-optimal UL performance. Instead, it would have been beneficial to select TCI state Y since this would avoid the 3 dB P-MPR (only known at the UE from d) and, therefore, the PH would overall increase with 2 dB. In summary, the network is not aware of the P-MPR impact in advance, and may therefore sub-optimally select TCI state X.

In the present disclosure, PRB and resource block (RB) may be used interchangeably; while an example may only refer to one, the other may be appropriately substituted.

P-MPR might be applied by the UE during a TCI addition/change because the added/changed TCI state/beam might overlap with another active TCI state/beam of the UE, resulting in a suboptimal beam selection and suboptimal UE transmit power. In an example embodiment, the network may be informed of the potential P-MPR before it selects a beam pair for simultaneous TX (i.e. STxMP). A technical effect of example embodiments of the present disclosure may be to utilize the full potential of UL MIMO.

The considered beam pair update may be provided due to/in response to various causes. For example, the update may be provided due to adding a second TRP, due to changes in channel conditions, due to UE movement/rotation, etc.

In an example embodiment, the network may be informed, by the UE, about the P-MPR (up to 3 dB) that is applied due to STxMP (i.e. reactively), or will be applied due to STxMP if a TCI switch is performed (i.e. proactively). Based on this information, the network may evaluate TCI state pair selection(s) in UL for the UE and optimize UL performance by considering the potential P-MPR due to STxMP. In other words, a more accurate UL estimation may be given by the UE to the network by informing the network of the need for P-MPR, which may optimize gNB UL beam selection.

In an example embodiment, UE reporting may be added to inform the network about P-MPR due to STxMP on selected beam pairs by, for example, proactively indicating P-MPR reduction resulting from a potential switch to a different combination of UL TCI states for simultaneous UL transmission.

In an example embodiment, UE reporting may be added to inform the network about P-MPR due to STxMP on selected beam pairs by, for example, reactively indicating the actual P-MPR for the actual TX beam combination for simultaneous UL transmission.

In an example embodiment, the network may consider alternative beam combinations while taking the required P-MPR into account. A technical effect of example embodiments of the present disclosure may be to enable the network to select a beam combination with similar path loss but less P-MPR (e.g. because the beams are not overlapping).

In an example embodiment, a network may still choose to schedule the physical uplink shared channel (PUSCH) on a pair of beams that may cause P-MPR if the UE has a sufficient margin to $P_{max}$, for example the reported PH is far above PH=0.

In an example embodiment, the P-MPR may be reported by the UE in a proactive way to the network (e.g. proactive P-MPR reporting), and the gNB may re-select beam pairs accordingly and avoid switching to non-preferred UL beam pairs. In an example embodiment, a UE (i.e. that is configured for STxMP) may report, to TRP A, about TCI state(s) belonging to TRP B. For example, the UE may report the potential P-MPR resulting from combining the active UL TCI states of TRP B (i.e. UL TCI state embedded in the activated codepoints, e.g. 4 UL TCI states) with the current indicated UL TCI state on TRP A. In an example embodiment, there may be one report per indicated TCI. Alternatively, a combined report may be used for all indicated TCI states.

In an alternative example embodiment, the UE may report all combinations of activated UL TCI states for each TRP. This may require that the PHR report is extended significantly.

Additional fields may be used to associate the P-MPR value to the resource indicator (see, e.g., FIG. 10). In an example embodiment, the existing single-TRP PHR may be used for the proactive P-MPR reporting. In an alternative example embodiment, the multi-TRP PHR may be updated by adding beam information for alternative TCI states, for example like already done for the single TRP PHR, for the proactive P-MPR reporting. In an alternative example embodiment, the L1-RSRP report may be updated to include the P-MPR for potential TCI state switches for the proactive P-MPR reporting.

In an example embodiment, the P-MPR may be reported by the UE in a reactive way to the network (e.g. reactive P-MPR reporting). A technical effect of this example embodiment may be to minimizes the UE reporting to the selected beam pair, and/or enable the gNB to switch, again, the UL beams to a better pair. This example embodiment implies multiple TCI state switches, which may have the technical effect of slowing down network operation (e.g. due to TCI switch delay requirements). This example embodiment may be considered to provide easier specification and UE procedure implementation. This example embodiment may require that the UE inform the network about the actual applied P-MPR.

In an example embodiment, the P-MPR may be reactively reported using existing multi-TRP PHR solution (i.e. without added information, for example see FIGS. 8-9). In an alternative example embodiment, the L1-RSRP report may be updated to include P-MPR for a current beam combination for reactive P-MPR reporting.

Figure 6:
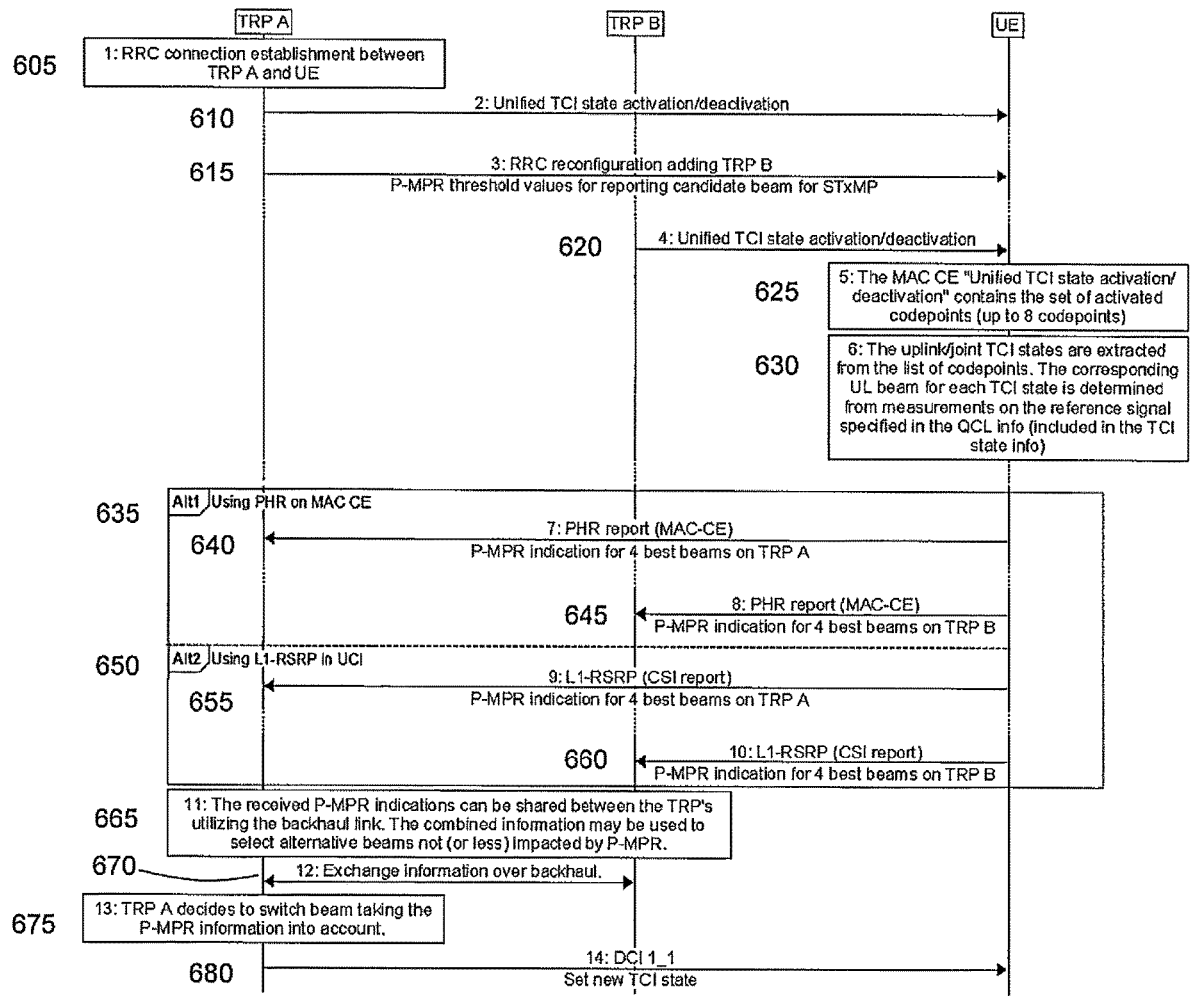
FIG. 6 is a flowchart illustrating steps as described herein.

Referring now to FIG. 6, illustrated is a message sequence chart for the proactive exchange of the P-MPR information from the UE to the TRPs. The two alternative methods (PHR and L1-RSRP report) are shown as alternative 1 (635) and 2 (650), respectively. Either of single downlink control information (sDCI) operation and multiple downlink control information (mDCI) operation may be used with respect to FIG. 6.

At 605, the TRP A may perform RRC connection establishment between TRP A and the UE. At 610, the TRP A may transmit, to the UE, a unified TCI state activation/deactivation. At 615, the TRP A may transmit, to the UE, RRC reconfiguration adding TRP B. This may include P-MPR threshold value(s) for reporting candidate beam for STxMP. In an example embodiment, the signaling of the P-MPR threshold values at 615 (RRC reconfiguration) may be supported for both proactive and reactive P-MPR reporting. This may allow the network to configure the thresholds for the P-MPR ranges, which may be reported by the P-MPR bits. The RRC reconfiguration may be optional.

At 620, TRP B may transmit, to the UE, unified TCI state activation/deactivation. At 625, at the UE, the MAC CE "Unified TCI state activation/deactivation" may contain a set of activated codepoints (up to 8 codepoints). At 630, the UE may extract the uplink/joint TCI states from the list of codepoints. The corresponding UL beam for each TCI state may be determined from measurements on the reference signal specified in the QCL information (included in the TCI state information).

In an example embodiment, the activated codepoints may be configured by the "Unified TCI state activation/deactivation" MAC CE message (620) and the UE may report the PH (640, 645) or L1 RSRP (655, 660) for the four best TCI states.

In a non-limiting example, the report may comprise: P-MPR1 of a pair of TRP1's best TCI and TRP B's TCI X; P-MPR2 of a pair TRP1's 2nd best TCI and TRP B's TCI X; P-MPR3 of a pair TRP1's 3rd best TCI and TRP B's TCI X; etc.

In alternative 1 (635), using PHR on MAC CE, at 640, the UE may transmit, to the TRP A, a PHR report in a MAC CE, which may include the P-MPR indication for the four best beams of TRP A. At 645, the UE may transmit, to TRP B, a PHR report in a MAC CE, which may include the P-MPR indication for the four best beams of TRP B.

In alternative 2 (650) using L1-RSRP in UCI, at 655, the UE may transmit, to TRP A, an L1-RSRP in a channel state information (CSI) report, which may include P-MPR indication for the 4 best beams of TRP A. At 660, the UE may transmit, to TRP B, an L1-RSRP in a CSI report, which may include P-MPR indication for the 4 best beams of TRP B.

It may be noted that L1 beam management typically reports the four best beams. The four best beams (or TCI states) indicated to TRP A (e.g. at 640 or 655) and TRP B (e.g. at 645 or 660) may be independent of each other. In an example embodiment, the PH and P-MPR reported in the two PHR reports may be different between the different TRPs. The reporting to each TRP may be done assuming that the TCI state on the other TRP stays unchanged. If the network needs to change the TCI state on both TRPs, then it may be assumed to happen sequentially (e.g. with a message in addition to 680).

In an example embodiment, an L1-report including STxMP P-MPR may be a trigger for the network to configure the UE with a single PHR report mode or with a twoPHR report mode. The TwoPHRmode is defined in TS 38.213 with: if a UE is provided twoPHRMode on active UL BWPb of carrier f of serving cell c and is provided two SRS resource sets in srs-ResourceSetToAddModList or srs-ResourceSetToAddModListDCI-0-2 with usage set to 'codebook' or 'nonCodebook', the UE may provide two Type 1 power headroom reports in a slot n. TS 38.331 also defines that twoPHRmode is used for UE to send PHR as 2 PHR in sDCI operation in mTRP.

In an example embodiment, the P-MPR may be reported along with the L1 RSRP/PHR. The network may then use this information to set a new indicated TCI state (680).

In an example embodiment, the UE may report, to the TRP, the P-MPR that will be applied if at least one pair of activated TCI states will be indicated by the TRP by a single DCI, where the report is before the indication. In an alternative example embodiment, the UE may report, to the TRP, the P-MPR (already) applied for the indicated pair of activated TCI states.

At 665, the received P-MPR indications may be shared between the TRPs utilizing a backhaul link. The combined information may be used to select alternative beams not (or less) impacted by P-MPR. At 670, information may be exchanged between TRP A and TRP B over backhaul. At 675, the TRP A may decide to switch the beam for the UE, taking into account P-MPR information. For example, some pair of TCI states may result in a lower P-MPR or a higher UE power compared to other pair(s) of activated TCI states.

At 680, the TRP A may transmit, to the UE, DCI 1_1, which may set new TCI state(s). A pair of activated TCI states may be indicated to the UE in a single DCI (i.e. sDCI). Alternatively, in case of mDCI mTRP operation, each of the TRPs may transmit its own DCI, and each DCI may indicate only one TCI state.

With Rel-18 definitions (agreed in RAN1), both TRP A and TRP B may activate the TCI states of TRP A or TRP B, interchangeably. For example, TRP B may transmit a TCI state activation in the case of sDCI operation (at 620). For example, TRP A may transmit an activation of TRP B's TCI states.

In an example embodiment, P-MPR indications may be sent periodically (e.g. if included in the PHR report) or triggered by specific conditions (e.g. if included in L1-RSRP report). Such triggering conditions may be event-driven (e.g. TCI switch or TCI addition or L1-RSRP/L1-SINR varying above a threshold).

In an example embodiment, P-MPR may always be reported for STxMP operation. Additionally or alternatively, P-MPR may be reported to TRP A when the UL TCI state is changed/added on TRP B (and vice versa). For example, a change of TCI state may be indicated with a received DCI. For example, a change of TCI state may be indicated with a received MAC CE. Additionally or alternatively, P-MPR may only be reported when PH of current link is below a threshold (e.g. $PH_{MPR\_reporting}$). These reporting conditions may also be combined; for example, there may be a condition that multiple conditions must be met in order to trigger reporting of P-MPR.

In an example embodiment, the network may also consider a prohibit timer to minimize reporting if there is no TCI switch/addition.

In an example embodiment, P-MPR bits may be mapped to P-MPR ranges for the PHR report, which may be directly specified or be configurable in the RRC reconfiguration (as shown at 615 in the messaging sequence chart in FIG. 5).

In an example embodiment, the L1-RSRP report (e.g. 650) may be embedded in a CSI report (as defined in 3GPP TS 38.212). The existing CSI report may not hold P-MPR values; TABLE 3 and TABLE 4 include the required addition of MPR fields to the CSI report. TABLE 4 includes two P-MPR values for each resource group, where each P-MPR value within a group may be mapped to beams that may be used simultaneously (e.g. because they are mapped to different UE panels).

TABLE 3 describes the mapping order of P-MPR fields of one CSI report (non-group based):

TABLE 3

| CSI report number | CSI fields |
| --- | --- |
| CSI report #n | CRI or SSBRI #1, if reported<br>CRI or SSBRI #2, if reported<br>CRI or SSBRI #3, if reported<br>CRI or SSBRI #4, if reported<br>RSRP #1, if reported<br>Differential RSRP #2, if reported<br>Differential RSRP #3, if reported<br>Differential RSRP #4, if reported<br>CapabilityIndex #1, if reported<br>CapabilityIndex #2, if reported<br>CapabilityIndex #3, if reported<br>CapabilityIndex #4, if reported<br>P-MPR #1, if reported<br>P-MPR #2, if reported<br>P-MPR #3, if reported<br>P-MPR #4, if reported |

It may be noted that, in TABLE 3, the four best beams for L1 beam management may be described, as well as the P-MPR fields where, for example, P-MPR #1 has value xyz and will be applied by the UE to transmit on CRI #1 in case of STxMP. P-MPR #2 has value kmn to be applied on CRI #2 etc.

TABLE 4 describes the mapping order of P-MPR fields of one CSI report (group based):

TABLE 4

| CSI report number | CSI fields |
| --- | --- |
| CSI report #n | Resource set indicator<br>CRI or SSBRI #1 of 1st resource group, if reported<br>CRI or SSBRI #2 of 1st resource group, if reported<br>CRI or SSBRI #1 of 2nd resource group, if reported<br>CRI or SSBRI #2 of 2nd resource group, if reported<br>CRI or SSBRI #1 of 3rd resource group, if reported<br>CRI or SSBRI #2 of 3rd resource group, if reported<br>CRI or SSBRI #1 of 4th resource group, if reported<br>CRI or SSBRI #2 of 4th resource group, if reported<br>RSRP of CRI or SSBRI #1 of 1st resource group<br>Differential RSRP of CRI or SSBRI #2 of 1st resource group<br>Differential RSRP of CRI or SSBRI #1 of 2nd resource group, if reported<br>Differential RSRP of CRI or SSBRI #2 of 2nd resource group, if reported<br>Differential RSRP of CRI or SSBRI #1 of 3rd resource group, if reported<br>Differential RSRP of CRI or SSBRI #2 of 3rd resource group, if reported<br>Differential RSRP of CRI or SSBRI #1 of 4th resource group, if reported<br>Differential RSRP of CRI or SSBRI #2 of 4th resource group, if reported<br>P-MPR #1 of $1^{st}$ resource group, if reported<br>P-MPR #2 of $1^{st}$ resource group, if reported<br>P-MPR #1 of $2^{nd}$ resource group, if reported<br>P-MPR #2 of $2^{nd}$ resource group, if reported<br>P-MPR #1 of $3^{rd}$ resource group, if reported<br>P-MPR #2 of $3^{rd}$ resource group, if reported<br>P-MPR #1 of $4^{th}$ resource group, if reported<br>P-MPR #2 of $4^{th}$ resource group, if reported |

In another example embodiment, the network may configure the UE such that the UE can only report in the CSI fields the UL pair that will not cause P-MPR.

In another example embodiment, the network may configure the UE to flag the UL beam pairs of the CSI fields that will not cause P-MPR. Alternatively, the network may configure the UE to flag the UL beam pairs that will not cause P-MPR.

In an example embodiment, the "MPE or R" bits may be shared between maximum permissible exposure (MPE) and STxMP for P-MPR reporting. The MPE/R bits may be used to indicate P-MPR due to STxMP, but only if the UE has reported STxMP capability to the network and in the case of P bit=0 (i.e. no P-MPR due to MPE). Cases in which P-MPR is required due to both MPE and STxMP are considered rare, since the type of devices considered for STxMP are not handheld devices (i.e. power class 3). However, in such cases where the UE needs to apply P-MPR due to both MPE and STxMP, the UE may report the range of the overall P-MPR.

In an example embodiment, a single PHR report may be transmitted, for example in TwoPHRMode case (i.e. only applicable to s-DCI, as in m-DCI, there are 2 PHR by default). In an example embodiment, the R bit in Octet1 may be interpreted, for example, as "S" (exceeded max peak EIRP due to STxMP) and may be used as:

1. P-MPR presence due to STxMP (and not MPE) if S=1. This bit may be a presence bit indicating the use (or not) of P-MPR, for example to avoid being above regulatory requirements in radiated power of the UE. In the rare case that the P-MPR is due to both MPE and STxMP, the UE may report the overall P-MPR and the UE may indicate that the reported P-MPR value is due to both MPE and STxMP by setting both the P and "S" bit (R bit in Octet1) to one.

2. Indication to read the 2 R bits in Octet2 as the P-MPR value used by the UE because the selected UL beam pair leads to exceeding max peak EIRP (i.e. in reactive approach).

It may be noted that the P bit and S bit are mutually exclusive; therefore, the 2 R bits in Octet2 may be reused for either of these presence bits. In other words, if there is MPE, then STxMP might not transmit with too high power, but if you have STxMP, you may still have MPE.

Furthermore, if the P-MPR is also needed on the additional reported TCI states (proactive P-MPR reporting), then the PHR report may similarly use the 2 R bits per TCI state in Octet4 for indicating the level of P-MPR due to STxMP operation on the UE and associate it to the corresponding Resource (CRI) in Octet5-8. A single R bit in each of Octet5-8 may be used to indicate that the P-MPR values in Octet 4 are due to STxMP operation (e.g. in order to ensure the device is not radiating power above the maximum peak EIRP regulatory limit).

Referring now to FIG. 7, illustrated is an example of a PHR report including reserved bits per SSBRI/CRI resource.

In an example embodiment, the multi-TRP PHR(s) may be updated to support proactive P-MPR reporting. In an example embodiment, a multi-TRP PHR report may be transmitted (e.g. two-PHR) as illustrated in FIGS. 8-9. FIG. 8 illustrates an example of reactive P-MPR reporting using an enhanced single entry PHR for multiple TRP MAC CE. FIG. 9 illustrates an example of reactive P-MPR reporting using an enhanced multiple entry PHR for multiple TRP MAC CE. Since these PHR reports do not have fields for reporting on the additional TCI states, they may not be used for proactive P-MPR reporting without adding extra fields to the messages. In an example embodiment, if either of the formats in FIGS. 8-9 are used for the reactive P-MPR reporting, the P-MPR presence may be conditional depending on the "P" bit. In an example embodiment, if P=0, then the two "MPE or R" bits may be used for P-MPR. Otherwise, P=1 may mean that MPE is reported; in this case P-MPR is not indicated, since MPR is not assumed to be necessary when MPE is used.

While FIG. 8 is limited to a single cell per TRP, FIG. 9 has multiple entries supporting multiple cells for each TRP (e.g. for uplink carrier aggregation). By applying a similar mapping as for the single-entry example, it may be possible to specify individual P-MPR values per entry/cell (e.g. PCell, Serving Cell 1, . . . , Serving Cell n).

In an example embodiment, in order to support proactive P-MPR reporting with the two-PHR reporting formats in FIGS. 8-9, the formats may be extended with fields covering additional TCI states. To be consistent with the single PHR message format, the following fields may be added: $MPE_1$ or R; $MPE_2$ or R; $MPE_3$ or R; $MPE_4$ or R; $Resource_1$; $Resource_2$; $Resource_3$; $Resource_4$; etc. These additional fields for proactive P-MPR reporting are illustrated in FIG. 10. For the multi entry PHR report in FIG. 9, the above fields may need to be added per entry, e.g. below each of the octets containing "MPE or R" fields.

In an example embodiment, the mapping of the P-MPR for MPE and for STxMP may be different even if they are reusing the same bits in case of PHR; the P-MPR for MPE is mapped from 3 dB and up, but the P-MPR for STxMP may be a maximum of 3 dB, so different thresholds may be needed. The actual ranges for the STxMP related P-MPR may be statically specified in a similar manner as it is done for MPE (refer to TS 38.133, section 10.1.26), but alternatively the thresholds for each range may be signaled as part of the RRC reconfiguration message when STxMP is supported. The range may comprise 3 dB, for example in steps of 1 dB. The network may then indicate the P-MPR thresholds P-MPR1, P-MPR2 and P-MPR3 and the actual P-MPR may then be mapped as shown in the example of TABLE 5. TABLE 5 describes an example of mapping of indicated bit value to P-MPR ranges. The limit of P-MPR ranges may be explicitly specified or configured by RRC signaling.

TABLE 5

| Bit 0 | Bit 1 | MPR Mapping |
| --- | --- | --- |
| 0 | 0 | P-MPR is below P-MPR$_1$ |
| 1 | 0 | P-MPR$_1$ <= P-MPR < P-MPR$_2$ |
| 0 | 1 | P-MPR$_2$ <= P-MPR < P-MPR$_3$ |
| 1 | 1 | P-MPR >= P-MPR$_3$ |

A technical effect of example embodiments of the present disclosure may be to inform the network about the P-MPR resulting from a potential TCI switch before the TCI switch is executed. A technical effect of example embodiments of the present disclosure may be to enable the network to evaluate if there is a better alternative TCI state which will not exhibit the same P-MPR. It may be noted that the P-MPR is just one of multiple parameters that the network may use to select UL TCI state.

Figure 11:
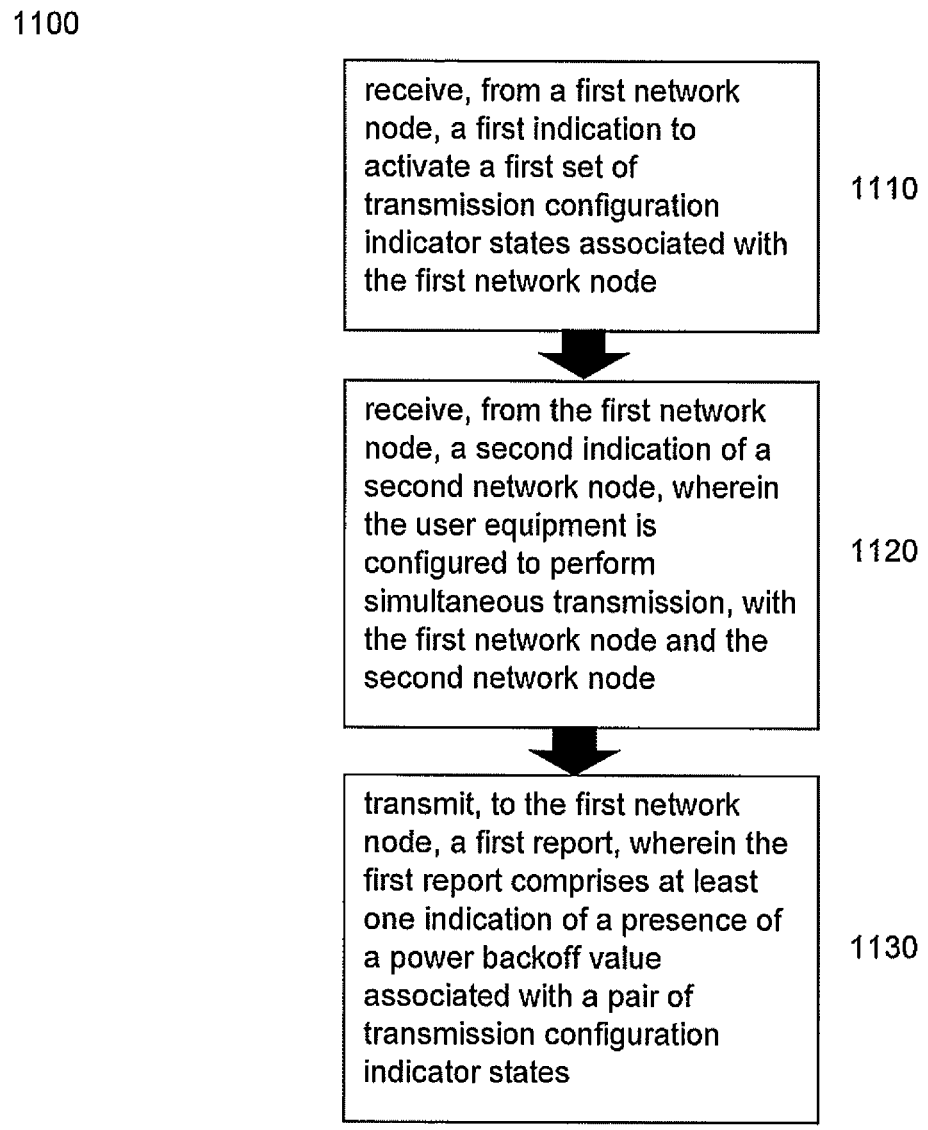
FIG. 11 is a flowchart illustrating steps as described herein.

FIG. 11 illustrates the potential steps of an example method 1100. The example method 1100 may include: receiving, from a first network node, a first indication to activate a first set of transmission configuration indicator states associated with the first network node, 1110; receiving, from the first network node, a second indication of a second network node, wherein the user equipment is configured to perform simultaneous transmission, with the first network node and the second network node, 1120; and transmitting, to the first network node, a first report, wherein the first report comprises at least one indication of a presence of a power backoff value associated with a pair of transmission configuration indicator states, 1130. The example method 1100 may be performed, for example, with a UE. The first network node may comprise a first transmission and reception point. The second network node may comprise a second transmission and reception point.

Figure 12:
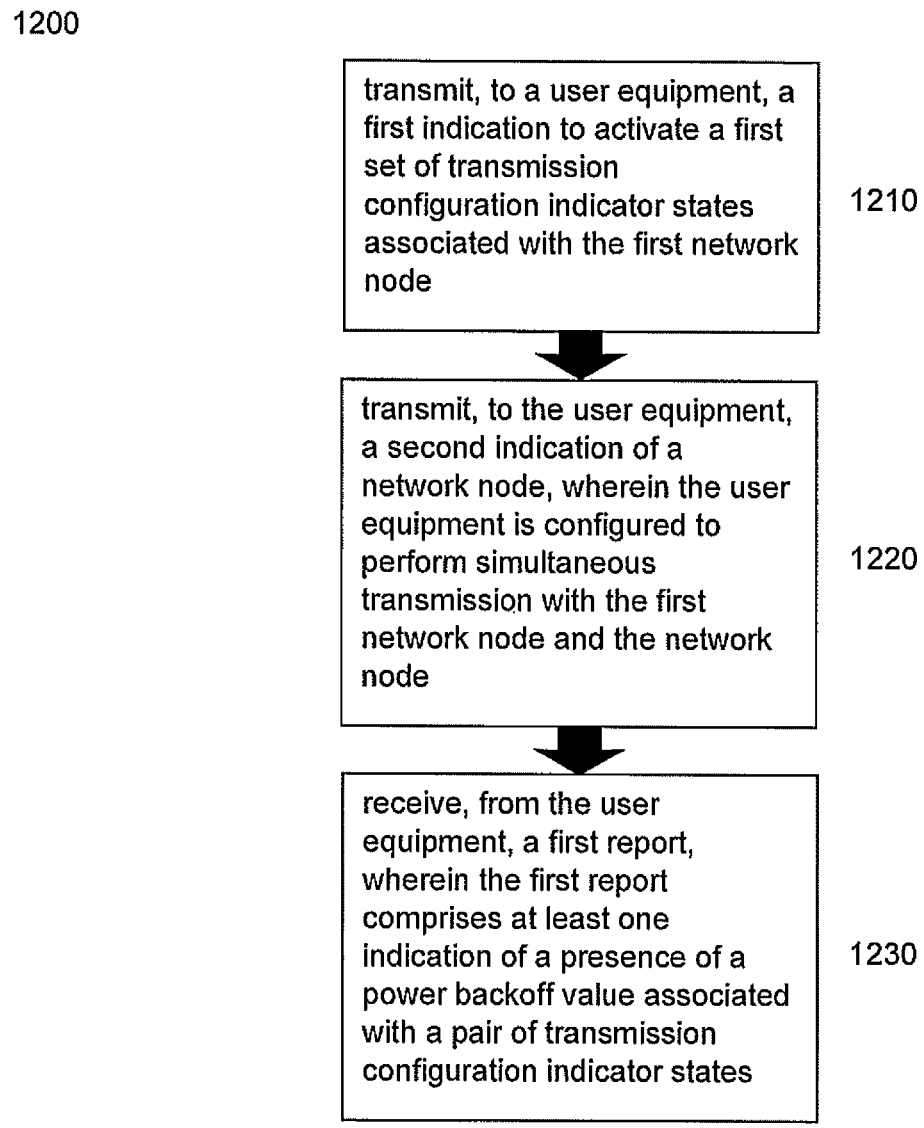
FIG. 12 is a flowchart illustrating steps as described herein.

FIG. 12 illustrates the potential steps of an example method 1200. The example method 1200 may include: transmitting, to a user equipment, a first indication to activate a first set of transmission configuration indicator states associated with the first network node, 1210; transmitting, to the user equipment, a second indication of a network node, wherein the user equipment is configured to perform simultaneous transmission with the first network node and the network node, 1220; and receiving, from the user equipment, a first report, wherein the first report comprises at least one indication of a presence of a power backoff value associated with a pair of transmission configuration indicator states, 1230. The example method 1200 may be performed, for example, with a network node, a base station, a transmission point, a reception point, a TRP, etc. The first network node may be, for example, with a network node, a base station, a transmission point, a reception point, a TRP, etc.

Figure 13:
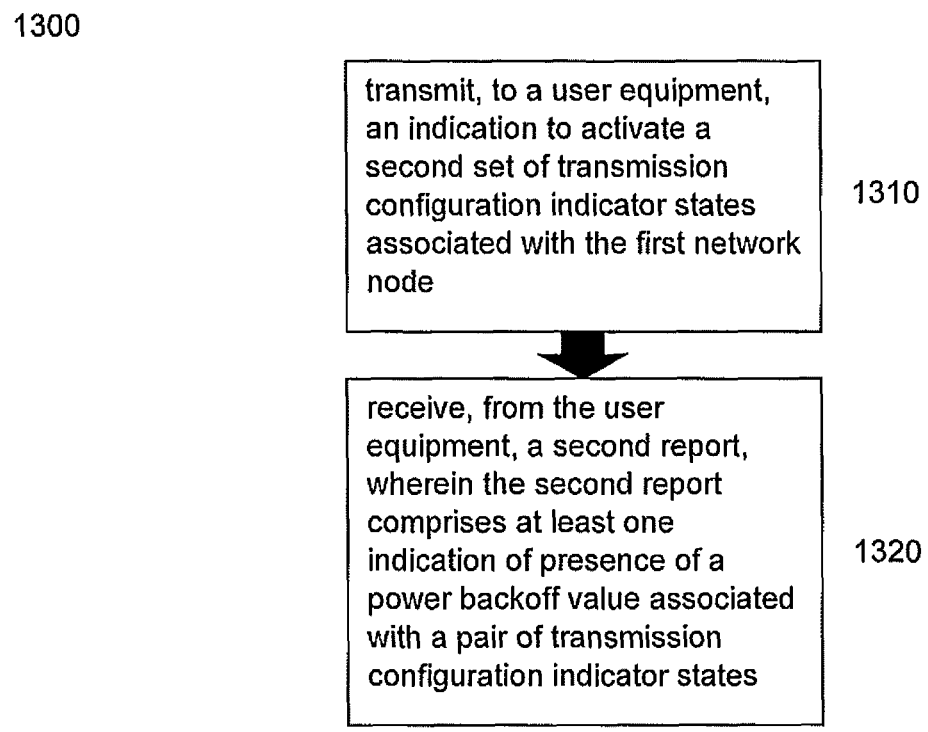
FIG. 13 is a flowchart illustrating steps as described herein.

FIG. 13 illustrates the potential steps of an example method 1300. The example method 1300 may include:

transmitting, to a user equipment, an indication to activate a second set of transmission configuration indicator states associated with the first network node, 1310; and receiving, from the user equipment, a second report, wherein the second report comprises at least one indication of presence of a power backoff value associated with a pair of transmission configuration indicator states, 1320. The example method 1300 may be performed, for example, with a network node, a base station, a transmission point, a reception point, a TRP, etc. The first network node may be, for example, with a network node, a base station, a transmission point, a reception point, a TRP, etc.

In accordance with one example embodiment, an apparatus may comprise: at least one processor; and at least one memory storing instructions that, when executed by the at least one processor, cause the apparatus at least to: receive, from a first network node, a first indication to activate a first set of transmission configuration indicator states associated with the first network node; receive, from the first network node, a second indication of a second network node, wherein the apparatus may be configured to perform simultaneous transmission, with the first network node and the second network node; and transmit, to the first network node, a first report, wherein the first report may comprise at least one indication of a presence of a power backoff value associated with a pair of transmission configuration indicator states.

The first report may comprise a plurality of indications of presence of power backoff values, wherein respective ones of the plurality of indications may be respectively associated with a pair of transmission configuration indicator states.

The example apparatus may be further configured to: determine an overlap between transmission with a transmission configuration indicator state from the first set of transmission configuration indicator states, and transmission with a transmission configuration indicator state from a second set of transmission configuration indicator states associated with the second network node; and determine the power backoff value based, at least partially, on: the determined overlap, a configured transmission power per transmission configuration indicator state, a maximum equivalent isotropic radiation power, a power headroom, a maximum output power limit, or a maximum total radiated power.

The example apparatus may be further configured to: transmit, to the second network node, a second report, wherein the second report may be at least partially different from the first report.

The power backoff value associated with the pair of transmission configuration indicator states may comprise a power backoff value applied to the pair of transmission configuration indicator states.

The first report may comprise at least one of: a multiple transmission and reception point power headroom report, or a layer one reference signal received power report.

The power backoff value associated with the pair of transmission configuration indicator states may comprise a power backoff value selected for future application to the pair of transmission configuration indicator states.

At least one transmission configuration indicator state of the pair of transmission configuration indicator states may be active, and another transmission configuration indicator state of the pair of transmission configuration indicator states may be inactive.

The first report may comprise at least one of: a single power headroom report, a multiple transmission and reception point power headroom report, wherein the multiple transmission and reception point power headroom report may comprise a power backoff value for a plurality of alternative transmission configuration indicator states, or a layer one reference signal received power report, wherein the layer one reference signal received power report may comprise a power backoff value for potential transmission configuration indicator state switches.

The layer one reference signal received power report may be configured to trigger configuration of the apparatus with at least one of: a single power headroom report mode, or a two power headroom report mode.

The example apparatus may be further configured to: receive, from the first network node, a third indication of an uplink grant associated with a further set of transmission configuration indicator states associated with the first network node and the second network node, wherein the further set of transmission configuration indicator states may be at least partially different from the pair of transmission configuration indicator states.

The third indication may comprise a single downlink control information message.

The example apparatus may be further configured to: receive a fourth indication to activate a second set of transmission configuration indicator states associated with the second network node, wherein the pair of transmission configuration indicator states may comprise, at least, a first transmission configuration indicator state from the first set of transmission configuration indicator states, and a second transmission configuration indicator state from the second set of transmission configuration indicator states.

The example apparatus may be further configured to: receive, from the first network node, a fifth indication of an uplink grant associated with a third set of transmission configuration indicator states associated with the first network node; and receive, from the second network node, a sixth indication of an uplink grant associated with a fourth set of transmission configuration indicator states associated with the second network node, wherein the third set of transmission configuration indicator states may be at least partially different from the pair of transmission configuration indicator states, wherein the fourth set of transmission configuration indicator states may be at least partially different from the pair of transmission configuration indicator states.

The fifth indication and the sixth indication respectively may comprise downlink control information messages.

The fourth indication may be received from one of: the first network node, or the second network node.

The example apparatus may be further configured to: receive a seventh indication of a threshold for the power backoff value for transmitting the first report.

The threshold for the power backoff value may be included in a radio resource control reconfiguration message.

The first report may be transmitted based on at least one of: change of a configured transmission configuration indicator state, addition of a transmission configuration indicator state, or a power headroom of a current link is below a threshold.

The example apparatus may be further configured to: transmit an eighth indication of at least one pair of transmission configuration indicator states for which a power backoff value is not needed.

The example apparatus may be further configured to: transmit a ninth indication that the presence of the power backoff value is based, at least partially, on at least one of: the simultaneous transmission, or maximum permissible exposure.

The at least one indication of the presence of the power backoff value may comprise an indication of a range of power backoff values.

The presence of the power backoff value may comprise a power management maximum power reduction value.

The first network node may comprise a first transmission and reception point, wherein the second network node may comprise a second transmission and reception point.

In accordance with one aspect, an example method may be provided comprising: receiving, with a user equipment, from a first network node, a first indication to activate a first set of transmission configuration indicator states associated with the first network node; receiving, from the first network node, a second indication of a second network node, wherein the user equipment may be configured to perform simultaneous transmission, with the first network node and the second network node; and transmitting, to the first network node, a first report, wherein the first report may comprise at least one indication of a presence of a power backoff value associated with a pair of transmission configuration indicator states.

The first report may comprise a plurality of indications of presence of power backoff values, wherein respective ones of the plurality of indications may be respectively associated with a pair of transmission configuration indicator states.

The example method may further comprise: determining an overlap between transmission with a transmission configuration indicator state from the first set of transmission configuration indicator states, and transmission with a transmission configuration indicator state from a second set of transmission configuration indicator states associated with the second network node; and determining the power backoff value based, at least partially, on: the determined overlap, a configured transmission power per transmission configuration indicator state, a maximum equivalent isotropic radiation power, a power headroom, a maximum output power limit, or a maximum total radiated power.

The example method may further comprise: transmitting, to the second network node, a second report, wherein the second report may be at least partially different from the first report.

The power backoff value associated with the pair of transmission configuration indicator states may comprise a power backoff value applied to the pair of transmission configuration indicator states.

The first report may comprise at least one of: a multiple transmission and reception point power headroom report, or a layer one reference signal received power report.

The power backoff value associated with the pair of transmission configuration indicator states may comprise a power backoff value selected for future application to the pair of transmission configuration indicator states.

At least one transmission configuration indicator state of the pair of transmission configuration indicator states may be active, and another transmission configuration indicator state of the pair of transmission configuration indicator states may be inactive.

The first report may comprise at least one of: a single power headroom report, a multiple transmission and reception point power headroom report, wherein the multiple transmission and reception point power headroom report may comprise a power backoff value for a plurality of alternative transmission configuration indicator states, or a layer one reference signal received power report, wherein the layer one reference signal received power report may comprise a power backoff value for potential transmission configuration indicator state switches.

The layer one reference signal received power report may be configured to trigger configuration of the user equipment with at least one of: a single power headroom report mode, or a two power headroom report mode.

The example method may further comprise: receiving, from the first network node, a third indication of an uplink grant associated with a further set of transmission configuration indicator states associated with the first network node and the second network node, wherein the further set of transmission configuration indicator states may be at least partially different from the pair of transmission configuration indicator states.

The third indication may comprise a single downlink control information message.

The example method may further comprise: receiving a fourth indication to activate a second set of transmission configuration indicator states associated with the second network node, wherein the pair of transmission configuration indicator states may comprise, at least, a first transmission configuration indicator state from the first set of transmission configuration indicator states, and a second transmission configuration indicator state from the second set of transmission configuration indicator states.

The example method may further comprise: receiving, from the first network node, a fifth indication of an uplink grant associated with a third set of transmission configuration indicator states associated with the first network node; and receiving, from the second network node, a sixth indication of an uplink grant associated with a fourth set of transmission configuration indicator states associated with the second network node, wherein the third set of transmission configuration indicator states may be at least partially different from the pair of transmission configuration indicator states, wherein the fourth set of transmission configuration indicator states may be at least partially different from the pair of transmission configuration indicator states.

The fifth indication and the sixth indication may respectively comprise downlink control information messages.

The fourth indication may be received from one of: the first network node, or the second network node.

The example method may further comprise: receiving a seventh indication of a threshold for the power backoff value for transmitting the first report.

The threshold for the power backoff value may be included in a radio resource control reconfiguration message.

The first report may be transmitted based on at least one of: change of a configured transmission configuration indicator state, addition of a transmission configuration indicator state, or a power headroom of a current link is below a threshold.

The example method may further comprise: transmitting an eighth indication of at least one pair of transmission configuration indicator states for which a power backoff value is not needed.

The example method may further comprise: transmitting a ninth indication that the presence of the power backoff value is based, at least partially, on at least one of: the simultaneous transmission, or maximum permissible exposure.

The at least one indication of the presence of the power backoff value may comprise an indication of a range of power backoff values.

The presence of the power backoff value may comprise a power management maximum power reduction value.

The first network node may comprise a first transmission and reception point, wherein the second network node may comprise a second transmission and reception point.

In accordance with one example embodiment, an apparatus may comprise: circuitry configured to perform: receiving, from a first network node, a first indication to activate a first set of transmission configuration indicator states associated with the first network node; circuitry configured to perform: receiving, from the first network node, a second indication of a second network node, wherein the apparatus may be configured to perform simultaneous transmission, with the first network node and the second network node; and circuitry configured to perform:

transmitting, to the first network node, a first report, wherein the first report may comprise at least one indication of a presence of a power backoff value associated with a pair of transmission configuration indicator states.

In accordance with one example embodiment, an apparatus may comprise: processing circuitry; memory circuitry including computer program code, the memory circuitry and the computer program code configured to, with the processing circuitry, enable the apparatus to: receive, from a first network node, a first indication to activate a first set of transmission configuration indicator states associated with the first network node; receive, from the first network node, a second indication of a second network node, wherein the apparatus may be configured to perform simultaneous transmission, with the first network node and the second network node; and transmit, to the first network node, a first report, wherein the first report may comprise at least one indication of a presence of a power backoff value associated with a pair of transmission configuration indicator states.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for: receiving, from a first network node, a first indication to activate a first set of transmission configuration indicator states associated with the first network node; receiving, from the first network node, a second indication of a second network node, wherein the apparatus may be configured to perform simultaneous transmission, with the first network node and the second network node; and transmitting, to the first network node, a first report, wherein the first report may comprise at least one indication of a presence of a power backoff value associated with a pair of transmission configuration indicator states.

In accordance with one example embodiment, an apparatus may comprise means for performing any of the foregoing example methods.

A processor, memory, and/or example algorithms (which may be encoded as instructions, program, or code) may be provided as example means for providing or causing performance of operation.

In accordance with one example embodiment, a non-transitory computer-readable medium comprising instructions stored thereon which, when executed with at least one processor, cause the at least one processor to: cause receiving, with a user equipment from a first network node, of a first indication to activate a first set of transmission configuration indicator states associated with the first network node; cause receiving, from the first network node, of a second indication of a second network node, wherein the user equipment may be configured to perform simultaneous transmission, with the first network node and the second network node; and cause transmitting, to the first network node, of a first report, wherein the first report may comprise at least one indication of a presence of a power backoff value associated with a pair of transmission configuration indicator states.

In accordance with one example embodiment, a non-transitory computer-readable medium comprising program instructions stored thereon for performing at least the following: causing receiving, with a user equipment from a first network node, of a first indication to activate a first set of transmission configuration indicator states associated with the first network node; causing receiving, from the first network node, of a second indication of a second network node, wherein the user equipment may be configured to perform simultaneous transmission, with the first network node and the second network node; and causing transmitting, to the first network node, of a first report, wherein the first report may comprise at least one indication of a presence of a power backoff value associated with a pair of transmission configuration indicator states.

In accordance with another example embodiment, a non-transitory program storage device readable by a machine may be provided, tangibly embodying instructions executable by the machine for performing operations, the operations comprising: causing receiving, with a user equipment from a first network node, of a first indication to activate a first set of transmission configuration indicator states associated with the first network node; causing receiving, from the first network node, of a second indication of a second network node, wherein the user equipment may be configured to perform simultaneous transmission, with the first network node and the second network node; and causing transmitting, to the first network node, of a first report, wherein the first report may comprise at least one indication of a presence of a power backoff value associated with a pair of transmission configuration indicator states.

In accordance with another example embodiment, a non-transitory computer-readable medium comprising instructions that, when executed by an apparatus, cause the apparatus to perform at least the following: causing receiving, with a user equipment from a first network node, of a first indication to activate a first set of transmission configuration indicator states associated with the first network node; causing receiving, from the first network node, of a second indication of a second network node, wherein the user equipment may be configured to perform simultaneous transmission, with the first network node and the second network node; and causing transmitting, to the first network node, of a first report, wherein the first report may comprise at least one indication of a presence of a power backoff value associated with a pair of transmission configuration indicator states.

A computer implemented system comprising: at least one processor and at least one non-transitory memory storing instructions that, when executed by the at least one processor, cause the system at least to perform: causing receiving, with a user equipment from a first network node, of a first indication to activate a first set of transmission configuration indicator states associated with the first network node; causing receiving, from the first network node, of a second indication of a second network node, wherein the user equipment may be configured to perform simultaneous transmission, with the first network node and the second network node; and causing transmitting, to the first network node, of a first report, wherein the first report may comprise at least one indication of a presence of a power backoff value associated with a pair of transmission configuration indicator states.

A computer implemented system comprising: means for causing receiving, with a user equipment from a first network node, of a first indication to activate a first set of transmission configuration indicator states associated with the first network node; means for causing receiving, from the first network node, of a second indication of a second network node, wherein the user equipment may be configured to perform simultaneous transmission, with the first network node and the second network node; and means for causing transmitting, to the first network node, of a first report, wherein the first report may comprise at least one indication of a presence of a power backoff value associated with a pair of transmission configuration indicator states.

In accordance with one example embodiment, an apparatus may comprise: at least one processor; and at least one memory storing instructions that, when executed by the at least one processor, cause the apparatus at least to: transmit, to a user equipment, a first indication to activate a first set of transmission configuration indicator states associated with the apparatus; transmit, to the user equipment, a second indication of a network node, wherein the user equipment may be configured to perform simultaneous transmission with the apparatus and the network node; and receive, from the user equipment, a first report, wherein the first report may comprise at least one indication of a presence of a power backoff value associated with a pair of transmission configuration indicator states.

The first report may comprise a plurality of indications of presence of power backoff values, wherein respective ones of the plurality of indications may be respectively associated with a pair of transmission configuration indicator states.

The power backoff value associated with the pair of transmission configuration indicator states may comprise a power backoff value applied to the pair of transmission configuration indicator states.

The first report may comprise at least one of: a multiple transmission and reception point power headroom report, or a layer one reference signal received power report.

The power backoff value associated with the pair of transmission configuration indicator states may comprise a power backoff value selected for future application to the pair of transmission configuration indicator states.

At least one transmission configuration indicator state of the pair of transmission configuration indicator states may be active, and another transmission configuration indicator state of the pair of transmission configuration indicator states may be inactive.

The first report may comprise at least one of: a single power headroom report, a multiple transmission and reception point power headroom report, wherein the multiple transmission and reception point power headroom report may comprise a power backoff value for a plurality of alternative transmission configuration indicator states, or a layer one reference signal received power report, wherein the layer one reference signal received power report may e a power backoff value for potential transmission configuration indicator state switches.

The example apparatus may be further configured to: configure the user equipment with at least one of: a single power headroom report mode, or a two power headroom report mode in response to the first report comprising the layer one reference signal received power report.

The example apparatus may be further configured to: determine a further set of transmission configuration indicator states based, at least partially, on the first report, wherein the further set of transmission configuration indicator states may be associated with the apparatus and the network node, wherein the further set of transmission configuration indicator states may be at least partially different from the pair of transmission configuration indicator states; and transmit, to the user equipment, a third indication of an uplink grant associated with the further set of transmission configuration indicator states.

The third indication may comprise a single downlink control information message.

The example apparatus may be further configured to: transmit, to the user equipment, a fourth indication to activate a second set of transmission configuration indicator states associated with the network node, wherein the pair of transmission configuration indicator states may comprise, at least, a first transmission configuration indicator state from the first set of transmission configuration indicator states, and a second transmission configuration indicator state from the second set of transmission configuration indicator states.

The example apparatus may be further configured to: transmit, to the user equipment, a fifth indication of an uplink grant associated with a third set of transmission configuration indicator states associated with the apparatus, wherein the third set of transmission configuration indicator states may be at least partially different from the pair of transmission configuration indicator states.

The fifth indication may comprise a downlink control information message.

The example apparatus may be further configured to: transmit, to the user equipment, a sixth indication of a threshold for the power backoff value for transmitting the first report.

The threshold for the power backoff value may be included in a radio resource control reconfiguration message.

The example apparatus may be further configured to: receive, from the user equipment, a seventh indication of at least one pair of transmission configuration indicator states for which a power backoff value is not needed.

The example apparatus may be further configured to: receive, from the user equipment, an eighth indication that the presence of the power backoff value is based, at least partially, on at least one of: the simultaneous transmission, or maximum permissible exposure.

The at least one indication of the presence of the power backoff value may comprise an indication of a range of power backoff values.

The example apparatus may be further configured to: transmit, to the network node, the first report via a backhaul link.

The presence of the power backoff value may comprise a power management maximum power reduction value.

The apparatus may comprise a first transmission and reception point, wherein the network node may comprise a second transmission and reception point.

In accordance with one aspect, an example method may be provided comprising: transmitting, with a first network node to a user equipment, a first indication to activate a first set of transmission configuration indicator states associated with the first network node; transmit, to the user equipment, a second indication of a network node, wherein the user equipment may be configured to perform simultaneous transmission with the first network node and the network node; and receive, from the user equipment, a first report, wherein the first report may comprise at least one indication of a presence of a power backoff value associated with a pair of transmission configuration indicator states.

The first report may comprise a plurality of indications of presence of power backoff values, wherein respective ones of the plurality of indications may be respectively associated with a pair of transmission configuration indicator states.

The power backoff value associated with the pair of transmission configuration indicator states may comprise a power backoff value applied to the pair of transmission configuration indicator states.

The first report may comprise at least one of: a multiple transmission and reception point power headroom report, or a layer one reference signal received power report.

The power backoff value associated with the pair of transmission configuration indicator states may comprise a power backoff value selected for future application to the pair of transmission configuration indicator states.

At least one transmission configuration indicator state of the pair of transmission configuration indicator states may be active, and another transmission configuration indicator state of the pair of transmission configuration indicator states may be inactive.

The first report may comprise at least one of: a single power headroom report, a multiple transmission and reception point power headroom report, wherein the multiple transmission and reception point power headroom report may comprise a power backoff value for a plurality of alternative transmission configuration indicator states, or a layer one reference signal received power report, wherein the layer one reference signal received power report may comprise a power backoff value for potential transmission configuration indicator state switches.

The example method may further comprise: configuring the user equipment with at least one of: a single power headroom report mode, or a two power headroom report mode in response to the first report comprising the layer one reference signal received power report.

The example method may further comprise: determining a further set of transmission configuration indicator states based, at least partially, on the first report, wherein the further set of transmission configuration indicator states may be associated with the first network node and the network node, wherein the further set of transmission configuration indicator states may be at least partially different from the pair of transmission configuration indicator states; and transmitting, to the user equipment, a third indication of an uplink grant associated with the further set of transmission configuration indicator states.

The third indication may comprise a single downlink control information message.

The example method may further comprise: transmitting, to the user equipment, a fourth indication to activate a second set of transmission configuration indicator states associated with the network node, wherein the pair of transmission configuration indicator states may comprise, at least, a first transmission configuration indicator state from the first set of transmission configuration indicator states, and a second transmission configuration indicator state from the second set of transmission configuration indicator states.

The example method may further comprise: transmitting, to the user equipment, a fifth indication of an uplink grant associated with a third set of transmission configuration indicator states associated with the first network node, wherein the third set of transmission configuration indicator states may be at least partially different from the pair of transmission configuration indicator states.

The fifth indication may comprise a downlink control information message.

The example method may further comprise: transmitting, to the user equipment, a sixth indication of a threshold for the power backoff value for transmitting the first report.

The threshold for the power backoff value may be included in a radio resource control reconfiguration message.

The example method may further comprise: receiving, from the user equipment, a seventh indication of at least one pair of transmission configuration indicator states for which a power backoff value is not needed.

The example method may further comprise: receiving, from the user equipment, an eighth indication that the presence of the power backoff value is based, at least partially, on at least one of: the simultaneous transmission, or maximum permissible exposure.

The at least one indication of the presence of the power backoff value may comprise an indication of a range of power backoff values.

The example method may further comprise: transmitting, to the network node, the first report via a backhaul link.

The presence of the power backoff value may comprise a power management maximum power reduction value.

The first network node may comprise a first transmission and reception point, wherein the network node may comprise a second transmission and reception point.

In accordance with one example embodiment, an apparatus may comprise: circuitry configured to perform: transmitting to a user equipment, a first indication to activate a first set of transmission configuration indicator states associated with the apparatus; circuitry configured to perform: transmit, to the user equipment, a second indication of a network node, wherein the user equipment may be configured to perform simultaneous transmission with the apparatus and the network node; and circuitry configured to perform: receive, from the user equipment, a first report, wherein the first report may comprise at least one indication of a presence of a power backoff value associated with a pair of transmission configuration indicator states.

In accordance with one example embodiment, an apparatus may comprise: processing circuitry; memory circuitry including computer program code, the memory circuitry and the computer program code configured to, with the processing circuitry, enable the apparatus to: transmit, to a user equipment, a first indication to activate a first set of transmission configuration indicator states associated with the apparatus; transmit, to the user equipment, a second indication of a network node, wherein the user equipment may be configured to perform simultaneous transmission with the apparatus and the network node; and receive, from the user equipment, a first report, wherein the first report may comprise at least one indication of a presence of a power backoff value associated with a pair of transmission configuration indicator states.

In accordance with one example embodiment, an apparatus may comprise means for: transmitting, to a user equipment, a first indication to activate a first set of transmission configuration indicator states associated with the apparatus; transmitting, to the user equipment, a second indication of a network node, wherein the user equipment may be configured to perform simultaneous transmission with the apparatus and the network node; and receiving, from the user equipment, a first report, wherein the first report may comprise at least one indication of a presence of a power backoff value associated with a pair of transmission configuration indicator states.

In accordance with one example embodiment, an apparatus may comprise means for performing any of the foregoing example methods.

In accordance with one example embodiment, a non-transitory computer-readable medium comprising instructions stored thereon which, when executed with at least one processor, cause the at least one processor to: cause transmitting, with a first network node to a user equipment, of a first indication to activate a first set of transmission configuration indicator states associated with the first network node; cause transmitting, to the user equipment, of a second indication of a network node, wherein the user equipment may be configured to perform simultaneous transmission with the first network node and the network node; and cause receiving, from the user equipment, of a first report, wherein the first report may comprise at least one indication of a presence of a power backoff value associated with a pair of transmission configuration indicator states.

In accordance with one example embodiment, a non-transitory computer-readable medium comprising program instructions stored thereon for performing at least the following: causing transmitting, with a first network node to a user equipment, of a first indication to activate a first set of transmission configuration indicator states associated with the first network node; causing transmitting, to the user equipment, of a second indication of a network node, wherein the user equipment may be configured to perform simultaneous transmission with the first network node and the network node; and causing receiving, from the user equipment, of a first report, wherein the first report may comprise at least one indication of a presence of a power backoff value associated with a pair of transmission configuration indicator states.

In accordance with another example embodiment, a non-transitory program storage device readable by a machine may be provided, tangibly embodying instructions executable by the machine for performing operations, the operations comprising: causing transmitting, with a first network node to a user equipment, of a first indication to activate a first set of transmission configuration indicator states associated with the first network node; causing transmitting, to the user equipment, of a second indication of a network node, wherein the user equipment may be configured to perform simultaneous transmission with the first network node and the network node; and causing receiving, from the user equipment, of a first report, wherein the first report may comprise at least one indication of a presence of a power backoff value associated with a pair of transmission configuration indicator states.

In accordance with another example embodiment, a non-transitory computer-readable medium comprising instructions that, when executed by an apparatus, cause the apparatus to perform at least the following: causing transmitting, with a first network node to a user equipment, of a first indication to activate a first set of transmission configuration indicator states associated with the first network node; causing transmitting, to the user equipment, of a second indication of a network node, wherein the user equipment may be configured to perform simultaneous transmission with the first network node and the network node; and causing receiving, from the user equipment, of a first report, wherein the first report may comprise at least one indication of a presence of a power backoff value associated with a pair of transmission configuration indicator states.

A computer implemented system comprising: at least one processor and at least one non-transitory memory storing instructions that, when executed by the at least one processor, cause the system at least to perform: causing transmitting, with a first network node to a user equipment, of a first indication to activate a first set of transmission configuration indicator states associated with the first network node; causing transmitting, to the user equipment, of a second indication of a network node, wherein the user equipment may be configured to perform simultaneous transmission with the first network node and the network node; and causing receiving, from the user equipment, of a first report, wherein the first report may comprise at least one indication of a presence of a power backoff value associated with a pair of transmission configuration indicator states.

A computer implemented system comprising: means for causing transmitting, with a first network node to a user equipment, of a first indication to activate a first set of transmission configuration indicator states associated with the first network node; means for causing transmitting, to the user equipment, of a second indication of a network node, wherein the user equipment may be configured to perform simultaneous transmission with the first network node and the network node; and means for causing receiving, from the user equipment, of a first report, wherein the first report may comprise at least one indication of a presence of a power backoff value associated with a pair of transmission configuration indicator states.

In accordance with one example embodiment, an apparatus may comprise: at least one processor; and at least one memory storing instructions that, when executed by the at least one processor, cause the apparatus at least to: transmit, to a user equipment, an indication to activate a second set of transmission configuration indicator states associated with the apparatus; and receive, from the user equipment, a second report, wherein the second report may comprise at least one indication of presence of a power backoff value associated with a pair of transmission configuration indicator states.

The second report may comprise a plurality of indications of presence of power backoff values, wherein respective ones of the plurality of indications may be respectively associated with a pair of transmission configuration indicator states.

The power backoff value associated with the pair of transmission configuration indicator states may comprise a power backoff value applied to the pair of transmission configuration indicator states.

The second report may comprise at least one of: a multiple transmission and reception point power headroom report, or a layer one reference signal received power report.

The power backoff value associated with the pair of transmission configuration indicator states may comprise a power backoff value selected for future application to the pair of transmission configuration indicator states.

At least one transmission configuration indicator state of the pair of transmission configuration indicator states may be active, and another transmission configuration indicator state of the pair of transmission configuration indicator states may be inactive.

The second report may comprise at least one of: a single power headroom report, a multiple transmission and reception point power headroom report, wherein the multiple transmission and reception point power headroom report may comprise a power backoff value for a plurality of alternative transmission configuration indicator states, or a layer one reference signal received power report, wherein the layer one reference signal received power report may comprise a power backoff value for potential transmission configuration indicator state switches.

The example apparatus may be further configured to: configure the user equipment with at least one of: a single power headroom report mode, or a two power headroom report mode in response to the first report comprising the layer one reference signal received power report.

The example apparatus may be further configured to: receive, from the user equipment, an indication of at least one pair of transmission configuration indicator states for which a power backoff value is not needed.

The example apparatus may be further configured to: receive, from the user equipment, an indication that the presence of the power backoff value may be based, at least partially, on at least one of: the simultaneous transmission, or maximum permissible exposure.

The at least one indication of the presence of the power backoff value may comprise an indication of a range of power backoff values.

The example apparatus may be further configured to: transmit, to a network node, the second report via a backhaul link.

The pair of transmission configuration indicator states may comprise, at least, a transmission configuration indicator state from a first set of transmission configuration indicator states associated with a network node, and a transmission configuration indicator state from the second set of transmission configuration indicator states.

In accordance with one aspect, an example method may be provided comprising: transmitting, with a first network node to a user equipment, an indication to activate a second set of transmission configuration indicator states associated with the apparatus; and receiving, from the user equipment, a second report, wherein the second report may comprise at least one indication of presence of a power backoff value associated with a pair of transmission configuration indicator states.

The second report may comprise a plurality of indications of presence of power backoff values, wherein respective ones of the plurality of indications may be respectively associated with a pair of transmission configuration indicator states.

The power backoff value associated with the pair of transmission configuration indicator states may comprise a power backoff value applied to the pair of transmission configuration indicator states.

The second report may comprise at least one of: a multiple transmission and reception point power headroom report, or a layer one reference signal received power report.

The power backoff value associated with the pair of transmission configuration indicator states may comprise a power backoff value selected for future application to the pair of transmission configuration indicator states.

At least one transmission configuration indicator state of the pair of transmission configuration indicator states may be active, and another transmission configuration indicator state of the pair of transmission configuration indicator states may be inactive.

The second report may comprise at least one of: a single power headroom report, a multiple transmission and reception point power headroom report, wherein the multiple transmission and reception point power headroom report may comprise a power backoff value for a plurality of alternative transmission configuration indicator states, or a layer one reference signal received power report, wherein the layer one reference signal received power report may comprise a power backoff value for potential transmission configuration indicator state switches.

The example method may further comprise: configuring the user equipment with at least one of: a single power headroom report mode, or a two power headroom report mode in response to the first report comprising the layer one reference signal received power report.

The example method may further comprise: receiving, from the user equipment, an indication of at least one pair of transmission configuration indicator states for which a power backoff value is not needed.

The example method may further comprise: receiving, from the user equipment, an indication that the presence of the power backoff value is based, at least partially, on at least one of: the simultaneous transmission, or maximum permissible exposure.

The at least one indication of the presence of the power backoff value may comprise an indication of a range of power backoff values.

The example method may further comprise: transmitting, to a network node, the second report via a backhaul link.

The pair of transmission configuration indicator states may comprise, at least, a transmission configuration indicator state from a first set of transmission configuration indicator states associated with a network node, and a transmission configuration indicator state from the second set of transmission configuration indicator states.

In accordance with one example embodiment, an apparatus may comprise: circuitry configured to perform: transmitting, to a user equipment, an indication to activate a second set of transmission configuration indicator states associated with the apparatus; and circuitry configured to perform: receiving, from the user equipment, a second report, wherein the second report may comprise at least one indication of presence of a power backoff value associated with a pair of transmission configuration indicator states.

In accordance with one example embodiment, an apparatus may comprise: processing circuitry; memory circuitry including computer program code, the memory circuitry and the computer program code configured to, with the processing circuitry, enable the apparatus to: transmit, to a user equipment, an indication to activate a second set of transmission configuration indicator states associated with the apparatus; and receive, from the user equipment, a second report, wherein the second report may comprise at least one indication of presence of a power backoff value associated with a pair of transmission configuration indicator states.

In accordance with one example embodiment, an apparatus may comprise means for: transmitting, to a user equipment, an indication to activate a second set of transmission configuration indicator states associated with the apparatus; and receiving, from the user equipment, a second report, wherein the second report may comprise at least one indication of presence of a power backoff value associated with a pair of transmission configuration indicator states.

In accordance with one example embodiment, an apparatus may comprise means for performing any of the foregoing example methods.

In accordance with one example embodiment, a non-transitory computer-readable medium comprising instructions stored thereon which, when executed with at least one processor, cause the at least one processor to: cause transmitting, with a first network node to a user equipment, of an indication to activate a second set of transmission configuration indicator states associated with the first network node; and cause receiving, from the user equipment, off a second report, wherein the second report may comprise at least one indication of presence of a power backoff value associated with a pair of transmission configuration indicator states.

In accordance with one example embodiment, a non-transitory computer-readable medium comprising program instructions stored thereon for performing at least the following: causing transmitting, with a first network node to a user equipment, of an indication to activate a second set of transmission configuration indicator states associated with the first network node; and causing receiving, from the user equipment, off a second report, wherein the second report may comprise at least one indication of presence of a power backoff value associated with a pair of transmission configuration indicator states.

In accordance with another example embodiment, a non-transitory program storage device readable by a machine may be provided, tangibly embodying instructions executable by the machine for performing operations, the operations comprising: causing transmitting, with a first network node to a user equipment, of an indication to activate a second set of transmission configuration indicator states associated with the first network node; and causing receiving, from the user equipment, off a second report, wherein the second report may comprise at least one indication of presence of a power backoff value associated with a pair of transmission configuration indicator states.

In accordance with another example embodiment, a non-transitory computer-readable medium comprising instructions that, when executed by an apparatus, cause the apparatus to perform at least the following: causing transmitting, with a first network node to a user equipment, of an indication to activate a second set of transmission configuration indicator states associated with the first network node; and causing receiving, from the user equipment, off a second report, wherein the second report may comprise at least one indication of presence of a power backoff value associated with a pair of transmission configuration indicator states.

A computer implemented system comprising: at least one and at least one non-transitory memory storing processor instructions that, when executed by the at least one processor, cause the system at least to perform: causing transmitting, with a first network node to a user equipment, of an indication to activate a second set of transmission configuration indicator states associated with the first network node; and causing receiving, from the user equipment, off a second report, wherein the second report may comprise at least one indication of presence of a power backoff value associated with a pair of transmission configuration indicator states.

A computer implemented system comprising: means for causing transmitting, with a first network node to a user equipment, of an indication to activate a second set of transmission configuration indicator states associated with the first network node; and means for causing receiving, from the user equipment, off a second report, wherein the second report may comprise at least one indication of presence of a power backoff value associated with a pair of transmission configuration indicator states.

The term "non-transitory," as used herein, is a limitation of the medium itself (i.e. tangible, not a signal) as opposed to a limitation on data storage persistency (e.g., RAM vs. ROM).

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:
    at least one processor; and
    at least one memory storing instructions that, when executed by the at least one processor, cause the apparatus at least to:
        receive, from a first network node, a first indication to activate a first set of transmission configuration indicator states associated with the first network node;
        receive, from the first network node, a second indication of a second network node, wherein the apparatus is configured to perform simultaneous transmission, with the first network node and the second network node; and
        transmit, to the first network node, a first report, wherein the first report comprises at least one indication of a presence of a power backoff value associated with a pair of transmission configuration indicator states,
        wherein the at least one indication of the presence of the power backoff value comprises an indication of a range of power backoff values.

2. The apparatus of claim 1, wherein the first report comprises a plurality of indications of presence of power backoff values, wherein respective ones of the plurality of indications are respectively associated with a pair of transmission configuration indicator states.

3. The apparatus of claim 1, wherein the at least one memory stores instructions that, when executed by the at least one processor, cause the apparatus to:
    determine an overlap between transmission with a transmission configuration indicator state from the first set of transmission configuration indicator states, and transmission with a transmission configuration indicator state from a second set of transmission configuration indicator states associated with the second network node; and
    determine the power backoff value based, at least partially, on:
        the determined overlap,
        a configured transmission power per transmission configuration indicator state,
        a maximum equivalent isotropic radiation power,
        a power headroom,
        a maximum output power limit, or
        a maximum total radiated power.

4. The apparatus of claim 1, wherein the at least one memory stores instructions that, when executed by the at least one processor, cause the apparatus to:
transmit, to the second network node, a second report, wherein the second report is at least partially different from the first report.

5. The apparatus of claim 1, wherein the power backoff value associated with the pair of transmission configuration indicator states comprises a power backoff value applied to the pair of transmission configuration indicator states.

6. The apparatus of claim 5, wherein the first report comprises at least one of:
a multiple transmission and reception point power headroom report, or
a layer one reference signal received power report.

7. The apparatus of claim 1, wherein the presence of the power backoff value comprises a power management maximum power reduction value.

8. A method comprising:
receiving, with a user equipment, from a first network node, a first indication to activate a first set of transmission configuration indicator states associated with the first network node;
receiving, from the first network node, a second indication of a second network node, wherein the user equipment is configured to perform simultaneous transmission, with the first network node and the second network node; and
transmitting, to the first network node, a first report, wherein the first report comprises at least one indication of a presence of a power backoff value associated with a pair of transmission configuration indicator states, wherein the at least one indication of the presence of the power backoff value comprises an indication of a range of power backoff values.

9. The method of claim 8, wherein the first report comprises a plurality of indications of presence of power backoff values, wherein respective ones of the plurality of indications are respectively associated with a pair of transmission configuration indicator states.

10. The method of claim 8, wherein the power backoff value associated with the pair of transmission configuration indicator states comprises a power backoff value applied to the pair of transmission configuration indicator states.

11. The method of claim 10, wherein the first report comprises at least one of:
a multiple transmission and reception point power headroom report, or
a layer one reference signal received power report.

12. The method of claim 8, wherein the presence of the power backoff value comprises a power management maximum power reduction value.

13. The method of claim 8, further comprising:
determining an overlap between transmission with a transmission configuration indicator state from the first set of transmission configuration indicator states, and transmission with a transmission configuration indicator state from a second set of transmission configuration indicator states associated with the second network node; and
determining the power backoff value based, at least partially, on:
the determined overlap,
a configured transmission power per transmission configuration indicator state,
a maximum equivalent isotropic radiation power,
a power headroom,
a maximum output power limit, or
a maximum total radiated power.

14. An apparatus comprising:
at least one processor; and
at least one memory storing instructions that, when executed by the at least one processor, cause the apparatus at least to:
transmit, to a user equipment, a first indication to activate a first transmission set of configuration indicator states associated with the apparatus;
transmit, to the user equipment, a second indication of a network node, wherein the user equipment is configured to perform simultaneous transmission with the apparatus and the network node; and
receive, from the user equipment, a first report, wherein the first report comprises at least one indication of a presence of a power backoff value associated with a pair of transmission configuration indicator states, wherein the at least one indication of the presence of the power backoff value comprises an indication of a range of power backoff values.

15. The apparatus of claim 14, wherein the first report comprises a plurality of indications of presence of power backoff values, wherein respective ones of the plurality of indications are respectively associated with a pair of transmission configuration indicator states.

16. The apparatus of claim 14, wherein the power backoff value associated with the pair of transmission configuration indicator states comprises a power backoff value applied to the pair of transmission configuration indicator states.

17. The apparatus of claim 16, wherein the first report comprises at least one of:
a multiple transmission and reception point power headroom report, or
a layer one reference signal received power report.

18. The apparatus of claim 14, wherein the at least one memory stores instructions that, when executed by the at least one processor, cause the apparatus to:
transmit, to the network node, the first report via a backhaul link.

19. The apparatus of claim 14, wherein the presence of the power backoff value comprises a power management maximum power reduction value.

20. The apparatus of claim 14, wherein the power backoff value comprises a power backoff value determined based, at least partially, on:
an overlap between transmission with a transmission configuration indicator state from the first set of transmission configuration indicator states, and transmission with a transmission configuration indicator state from a second set of transmission configuration indicator states associated with the second network node,
a configured transmission power per transmission configuration indicator state,
a maximum equivalent isotropic radiation power,
a power headroom,
a maximum output power limit, or
a maximum total radiated power.

* * * * *

UNITED STATES PATENT AND TRADEMARK OFFICE
CERTIFICATE OF CORRECTION

| | | |
|---|---|---|
| PATENT NO. | : 12,279,213 B2 | Page 1 of 1 |
| APPLICATION NO. | : 18/926402 | |
| DATED | : April 15, 2025 | |
| INVENTOR(S) | : Knud Knudsen et al. | |

It is certified that error appears in the above-identified patent and that said Letters Patent is hereby corrected as shown below:

On the Title Page

Item [73], "Nok Technologies Oy" should be deleted and --Nokia Technologies Oy-- should be inserted.

Signed and Sealed this
Seventeenth Day of June, 2025

Coke Morgan Stewart
*Acting Director of the United States Patent and Trademark Office*